US011270021B2

(12) United States Patent
Dunjic et al.

(10) Patent No.: US 11,270,021 B2
(45) Date of Patent: Mar. 8, 2022

(54) MODIFICATION OF DATA SHARING BETWEEN SYSTEMS

(71) Applicant: The Toronto-Dominion Bank, Toronto (CA)

(72) Inventors: Milos Dunjic, Oakville (CA); Anthony Haituyen Nguyen, Toronto (CA); Gregory Albert Kliewer, Barrie (CA); David Samuel Tax, Toronto (CA); Sairam Srinivasa Poguluru, Richmond Hill (CA); Shishir Dattatraya Bhat, Toronto (CA)

(73) Assignee: THE TORONTO-DOMINION BANK, Toronto (CA)

( * ) Notice: Subject to any disclaimer, the term of this patent is extended or adjusted under 35 U.S.C. 154(b) by 265 days.

(21) Appl. No.: 16/431,786

(22) Filed: Jun. 5, 2019

(65) Prior Publication Data

US 2020/0387624 A1 Dec. 10, 2020

(51) Int. Cl.
*G06F 21/62* (2013.01)
*G06F 21/57* (2013.01)
*G06F 21/55* (2013.01)
*G06F 21/33* (2013.01)

(52) U.S. Cl.
CPC ........ *G06F 21/6236* (2013.01); *G06F 21/335* (2013.01); *G06F 21/552* (2013.01); *G06F 21/577* (2013.01)

(58) Field of Classification Search
CPC .... G06F 21/335; G06F 21/552; G06F 21/577; G06F 21/6236
See application file for complete search history.

(56) References Cited

U.S. PATENT DOCUMENTS

| 8,776,168 B1 | 7/2014 | Gibson et al. |
| 9,292,677 B2 | 3/2016 | Ranganathan et al. |
| 9,667,639 B1 | 5/2017 | Pierson et al. |
| 9,952,790 B2 | 4/2018 | Kamble |

(Continued)

OTHER PUBLICATIONS

Hao Jin • Yan Luo • Peilong Li • Jomol Mathew; A Review of Secure and Privacy-Preserving Medical Data Sharing; IEEE Access (vol. 7, pp. 61656-61669); (Year: 2019).*
Thomas F. J.-M Pasquier • Jatinder Singh • David Eyers • Jean Bacon; Camflow: Managed Data-Sharing for Cloud Services; IEEE Transactions on Cloud Computing (vol. 5, Issue: 3, pp. 472-484); (Year: 2017).*

(Continued)

*Primary Examiner* — Jahangir Kabir
*Assistant Examiner* — Chao Wang
(74) *Attorney, Agent, or Firm* — Rowand LLP

(57) ABSTRACT

In an aspect, the present application may describe a method including: receiving, from a remote computing device and at a server, an indication of consent for an authenticated entity to share data with a third party server; in response to receiving the indication of consent, issuing an access token to the third party server, the access token for accessing data associated with the authenticated entity; monitoring a risk parameter associated with one or both of the third party server and the authenticated entity to detect a change in the risk parameter; determining, based on input received from the authenticated entity, that data sharing with the third party server is to be modified based on the change in risk parameter; and modifying the sharing of data for the authenticated entity with the third party server by revoking the access token or modifying an access permission associated with the access token.

20 Claims, 9 Drawing Sheets

(56) References Cited

U.S. PATENT DOCUMENTS

| | | |
|---|---|---|
| 9,959,367 B2 | 5/2018 | Ghent |
| 2006/0206941 A1 | 9/2006 | Collins |
| 2015/0066577 A1 | 3/2015 | Christiansen et al. |
| 2015/0332276 A1* | 11/2015 | Hosp ............... G06Q 20/12 705/44 |
| 2015/0363777 A1 | 12/2015 | Ronca et al. |
| 2017/0331840 A1 | 11/2017 | Ranjan |
| 2018/0083999 A1 | 3/2018 | Cherian |
| 2018/0183827 A1* | 6/2018 | Zorlular ............ H04L 63/1416 |
| 2018/0227361 A1 | 8/2018 | Tao et al. |
| 2018/0359244 A1* | 12/2018 | Cockerill ............ H04L 63/0876 |
| 2019/0028492 A1 | 1/2019 | Coleman et al. |
| 2019/0116172 A1* | 4/2019 | Caldwell ................ H04L 67/20 |
| 2020/0366682 A1* | 11/2020 | Aggarwal ............. H04L 47/805 |

OTHER PUBLICATIONS

Kyle Chard • Steven Tuecke • Ian Foster; Efficient and Secure Transfer, Synchronization, and Sharing of Big Data; IEEE Cloud Computing (vol. 1, Issue: 3, pp. 46-55); (Year: 2015).*

Chiara Cavaglieri; Open banking: sharing your financial data; "GoogleDate of publication: Feb. 2019" https://www.which.co.uk/money/banking/switching-your-bank/open-banking-sharing-your-financial-data-anscq4g8p62h.

Thanasis Petsas; Nippon-European Cyberdefense-Oriented Multilayer threat Analysis; "Google—Seventh Framework Programme Information & Communication Technologies ICTDate of publication: Oct. 2014", http://www.necoma-project.eu/m/filer_public/63/9d/639d43a9-22b3-4f7f-ac08-d66c63b9992e/necoma-d54.pdf.

* cited by examiner

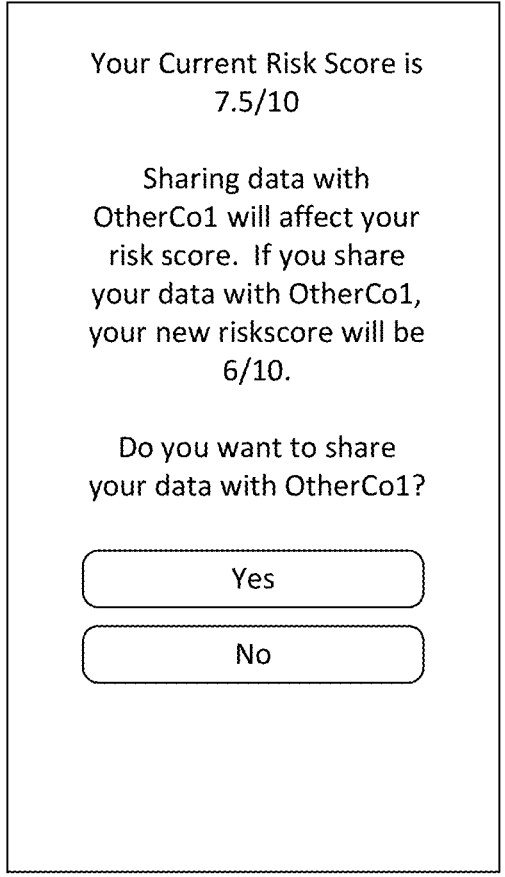
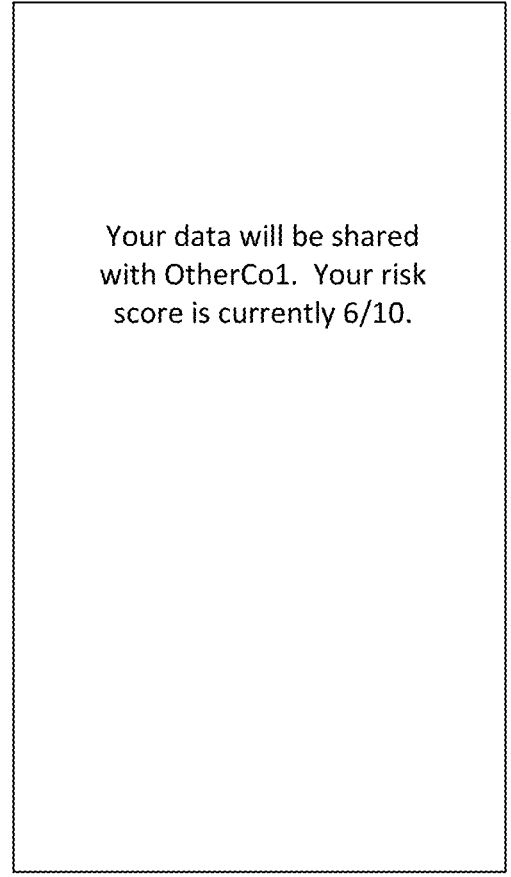
FIG. 9        FIG. 10

MODIFICATION OF DATA SHARING BETWEEN SYSTEMS

TECHNICAL FIELD

The present disclosure relates to methods and systems that provide for the secure sharing of data with other computing systems and, more particularly, to systems and methods for securing such data by adaptively modifying the sharing of such data.

BACKGROUND

Computing systems sometimes make use of secure data that is maintained by other computer systems. For example, personal financial management (PFM) services sometimes retrieve secure data such as account balances, transaction data, and/or personal data for a user by logging into a server with a username and password of another entity and then performing screen scraping to identify relevant data. Such systems are inherently insecure as they generally require entities to provide to the PFM service both their username and password. If the PFM becomes compromised (e.g., if it is hacked), the username and password could become available to rogue third parties who might use the login credentials to complete a fraudulent transaction, perform identify theft, etc.

To address security concerns associated with users providing usernames and passwords to third party services while allowing an enhanced customer experience by permitting third party developers to build applications and services that rely on secure data, there has been a shift towards providing third party services (such as PFMs) with access to secure data through application programming interfaces (APIs). Such access may be provided without exposing the username and password for users.

However, while APIs enhance security, there remain privacy and security concerns in allowing third party services to access secure data from other computer systems.

BRIEF SUMMARY

In an aspect, a server comprises a communications module; a processor coupled to the communications module; and a memory coupled to the processor, the memory storing processor-executable instructions which, when executed, configure the processor to receive, from a remote computing device and via the communications module, a signal representing an indication of consent for an authenticated entity to share data with a third party server; in response to receiving the indication of consent, issue an access token to the third party server, the access token for accessing data associated with the authenticated entity; monitor a risk parameter associated with the third party server to detect a change in the risk parameter; and responsive to detecting the change in the risk parameter: send, to the remote computing device and via the communications module, a notification that includes a first selectable option to modify a data sharing option associated with the third party server and a second selectable option to replace the third party server with an alternative third party server; determine, based on a signal received from the authenticated entity indicating selection of the first selectable option, that data sharing with the third party server is to be modified based on the change in risk parameter; and modify the data sharing for the authenticated entity with the third party server by at least one of revoking the access token and modifying an access permission associated with the access token.

In another aspect, a method comprises receiving, from a remote computing device and at a server, a signal representing an indication of consent for an authenticated entity to share data with a third party server; in response to receiving the indication of consent, issuing an access token to the third party server, the access token for accessing data associated with the authenticated entity; monitoring a risk parameter associated with the third party server to detect a change in the risk parameter; and responsive to detecting the change in the risk parameter: sending, to the remote computing device, a notification that includes a first selectable option to modify a data sharing option associated with the third party server and a second selectable option to replace the third party server with an alternative third party server; determining, based on a signal received from the authenticated entity indicating selection of the first selectable option, that data sharing with the third party server is to be modified based on the change in risk parameter; and modifying the data sharing for the authenticated entity with the third party server by at least one of revoking the access token and modifying an access permission associated with the access token.

In yet another aspect, a non-transitory computer readable storage medium includes processor-executable instructions which, when executed, configure a processor to perform a method described herein.

BRIEF DESCRIPTION OF THE DRAWINGS

Embodiments are described in detail below, with reference to the following drawings:

FIG. 9 is an example user interface in accordance with example embodiments of the present disclosure;

FIG. 10 is an example user interface in accordance with example embodiments of the present disclosure;

DETAILED DESCRIPTION OF VARIOUS EMBODIMENTS

Figure 1:
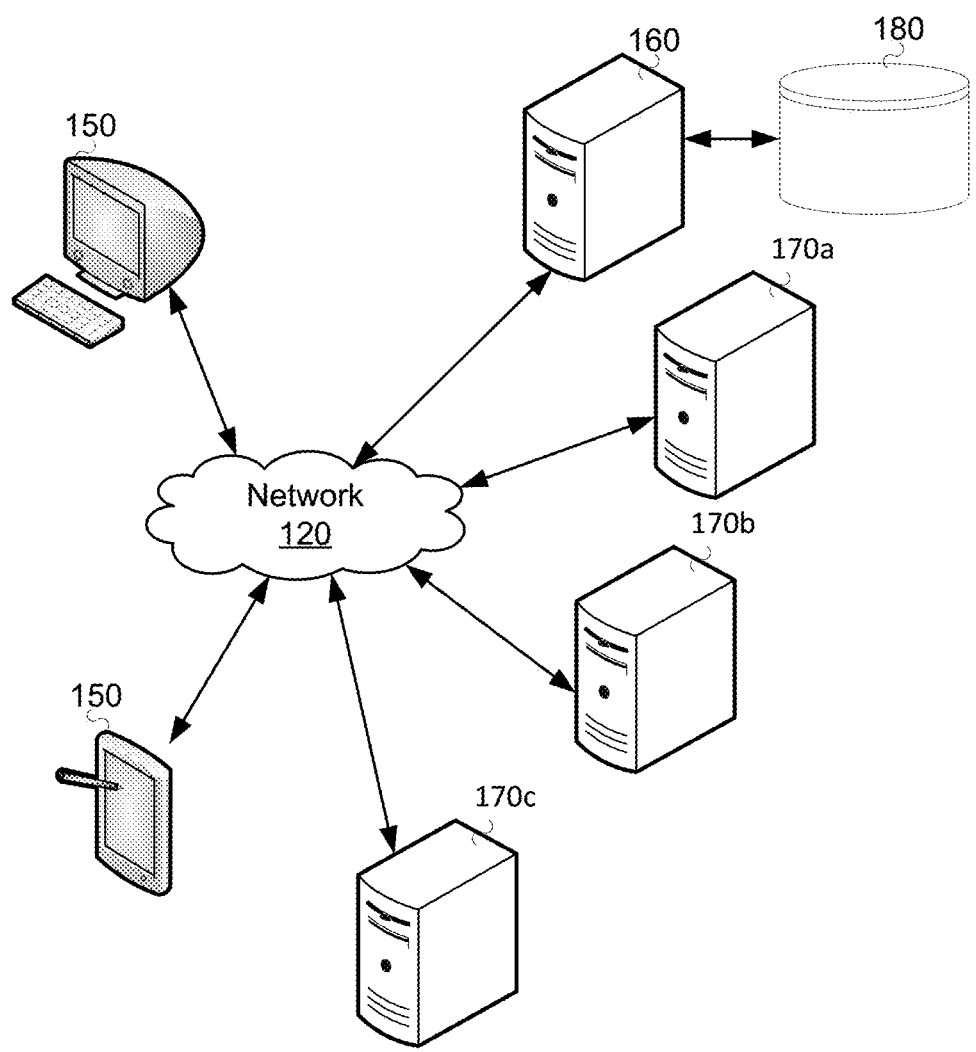
FIG. 1 is a schematic operation diagram illustrating an operating environment of an example embodiment.

In an aspect, the present application may describe a method. The method may include: receiving, from a remote computing device and at a server, a signal representing an indication of consent for an authenticated entity to share data with a third party server; in response to receiving the indication of consent, issuing an access token to the third party server, the access token for accessing data associated with the authenticated entity; monitoring a risk parameter associated with at least one of the third party server and the authenticated entity to detect a change in the risk parameter; determining, based on input received from the authenticated entity, that data sharing with the third party server is to be modified based on the change in risk parameter; and modify data sharing for the authenticated entity with the third party server by at least one of revoking the access token and modifying an access permission associated with the access token.

In at least some implementations, the method may include: in response to receiving the indication of consent, storing a score associated with the third party server, and wherein determining that data sharing with the third party server is to be modified based on the change in risk parameter comprises comparing a difference between the stored score and a current score to a threshold, the threshold based on the input received from the authenticated entity.

In at least some implementations, the method may include: receiving the input from the authenticated entity, the input including a preference; storing the preference in a memory; receiving a further input from the authenticated entity, the further input including an updated preference. In at least some implementations, determining, based on input received from the authenticated entity, that data sharing with the third party server is to be modified based on the change in risk parameter may include determining that a risk profile associated with the third party server is not compliant with the updated preference.

In at least some implementations, determining that data sharing with the third party server is to be modified may include at least one of: determining that a data breach associated with the third party server has occurred; determining that an application associated with the third party server has not been used for at least a predetermined period of time; determining that a score associated with the third party server has changed by at least a predetermined amount; determining that data access by the third party server has changed; determining that the third party server is not accessing at least some data that the server is with the third party server; and determining that the third party server is accessing data that is not required by the third party server.

In at least some implementations, the method may include: after detecting the change in the risk parameter, sending, to the remote computing device, a selectable option to modify a data sharing option associated with the third party server; and receive a signal indicating selection of the selectable option. The signal indicating selection of the selectable option may be the input received from the authenticated entity that is used to determine that data sharing with the third party server is to be modified.

In at least some implementations, the method may include: after detecting the change in the risk parameter: identify, based on category data associated with the third party server, an alternative third party server; and send, to the remote computing device, a notification, the notification suggesting replacement of the third party server with the alternative third party server.

In at least some implementations, determining that data sharing with the third party server is to be modified may include retrieving a stored risk profile for the authenticated entity.

In at least some implementations, modifying the sharing of data with the third party server may include revoking the access token.

In at least some implementations, modifying the sharing of data with the third party server may include modifying the access permission associated with the access token.

In at least some implementations, the method may include determining, based on a type associated with a detected condition, whether access to data is to be revoked or reduced.

In an aspect, the present application describes a server. The server may include a communications module, a processor coupled to the communications module, and a memory coupled to the processor. The memory may store processor-executable instructions which, when executed, configure the processor to perform a method described herein.

In a further aspect, there is provided a non-transitory computer readable storage medium including processor-executable instructions which, when executed, configure a processor to perform a method described herein.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

FIG. 1 is a schematic operation diagram illustrating an operating environment of an example embodiment.

As illustrated, a server 160 and remote computing devices 150 communicate via a network 120. The remote computing devices 150 are computing devices that may be associated with an entity, such as a user or client, which is associated with secure data available to the server 160. The secure data may be stored in a secure storage 180. The secure storage 180 is memory and the secure data may be data of various types. For example, the secure data may be data that is associated with an account for a particular entity, such as an entity that may be associated with one of the remote computing devices 150. For example, the secure data may be account data; that is, data associated with an account for that entity. The secure data may include various types of data including, for example, financial data including banking data such as a bank balance or a transaction listing (e.g., which may include one or more historical transactions associated with the account such as debits from and credits to the account). The banking data may, in at least some embodiments, be processed or determined data such as, for example, an average balance associated with an account, an average spending amount associated with an account, a total spending amount over a period of time, or other data that may be determined by a processor associated with the server 160.

The secure data may include personal data such as personal identification information. The personal identification information may include any stored personal details associated with the entity including, for example, a home, work or mailing address, contact information such as a messaging address (e.g., an email address) and/or a telephone number, a government issued identifier such as a social insurance number (SIN) and/or driver's license number, a date of birth, an age, etc.

The server 160 may also communicate with one or more third party servers 170a, 170b, 170c. In the illustrated example, the third party servers 170a, 170b, 170c include a first third party server 170a, a second third party server 170b and a third third party server 170c. However, the number of third party servers may vary.

The third party servers 170a, 170b, 170c may provide third party services and/or applications that utilize secure data associated with the server 160. For example, a third party server may provide a personal financial management (PFM) application that utilizes financial data associated with the server 160. In order to utilize the secure data associated with the server 160 in providing third party services/applications, the third party servers 170a, 170b, 170c may communicate with the server 160 over the network 120. For example, the server 160 may provide an application programming interface (API) or another interface which allows the third party servers 170a, 170b, 170c to obtain secure data associated with a particular entity (such as a user having an account with the server 160).

Such access to secure data may only be provided to third party servers 170a, 170b, 170c with the consent of the entity that is associated with the data. For example, one or more of the remote computing devices 150 may be adapted to receive a signal indicating consent to share data with a selected one of the third party servers 170a, 170b, 170c and may, in response, send an indication of consent to the server 160 which may then configure data sharing with for third party server 170a, 170b, 170c. For example, the server 160 may provide an access token to the third party server 170a, 170b, 170c. The access token may be configured to allow the third party server 170a, 170b, 170c to access secure data (e.g., through the API) associated with the entity that provided consent. The indication of consent may specify a sharing permission such as a type of data that the third party server is to be permitted to access. For example, the server 160 may have access to secure data of various types (e.g., an account balance, a transaction listing, personal identification data, etc.) and the indication of consent may specify the type or types of data that the third party server 170a, 170b, 170c is to be permitted to access. The server 160 may configure data sharing in accordance with the sharing permission.

The access token may be issued by the server 160 or may be issued by a separate system, which may be referred to as a token service provider (TSP), which may issue tokens on behalf of the server 160. The access token represents the authorization of a specific third party server to access specific parts of the secure data. The access token may, for example, be an OAuth token or a variation thereof. OAuth is an open standard. The OAuth 1.0 protocol was published as RFC 5849 and the OAuth 2.0 framework was published as RFC 6749 and bearer token usage as RFC 6750. All of these documents are incorporated herein by reference.

The remote computing devices 150, the server 160 and the third party servers 170a, 170b, 170c may be in geographically disparate locations. Put differently, the remote computing devices 150 may be remote from the server 160 and the server 160 may be remote from the third party servers 170a, 170b, 170c.

The remote computing devices 150, the server 160 and the third party servers 170a, 170b, 170c are computer systems. The remote computing devices 150 may take a variety of forms including, for example, a mobile communication device such as a smartphone, a tablet computer, a wearable computer such as a head-mounted display or smartwatch, a laptop or desktop computer, or a computing device of another type.

The remote computing devices 150 may communicate with one or more of the third party servers 170a, 170b, 170c via the network 120 in order to access the third party services/applications provided by the third party servers. For example, where a third party server 170a provides or supports a PFM service/application, a remote computing device 150 may access the third party server providing or supporting the PFM service/application. The PFM service/application may, for example, configure one or more of the remote computing devices 150 to present graphical user interfaces that present a financial snapshot to the user of such devices. For example, the PFM may aggregate financial transactions from multiple sources (including the server 160) in one place. The graphical user interfaces that are presented may be based on the secure data obtained by the third party server 170a, 170b, 170c from the server 160 for that user. By way of example, the graphical user interfaces may provide cash flow, spending trends, net worth, debt management and/or goal-related information.

The network 120 is a computer network. In some embodiments, the network 120 may be an internetwork such as may be formed of one or more interconnected computer networks. For example, the network 120 may be or may include an Ethernet network, an asynchronous transfer mode (ATM) network, a wireless network, or the like.

As noted previously, the server 160 may have access to secure data stored in secure storage 180. The secure storage 180 may be provided internally within the server 160 or externally. The secure storage 180 may, for example, be provided remotely from the server 160. For example, the secure storage 180 may include one or more data centers. The data centers may, for example, store data with bank-grade security.

Figure 2:
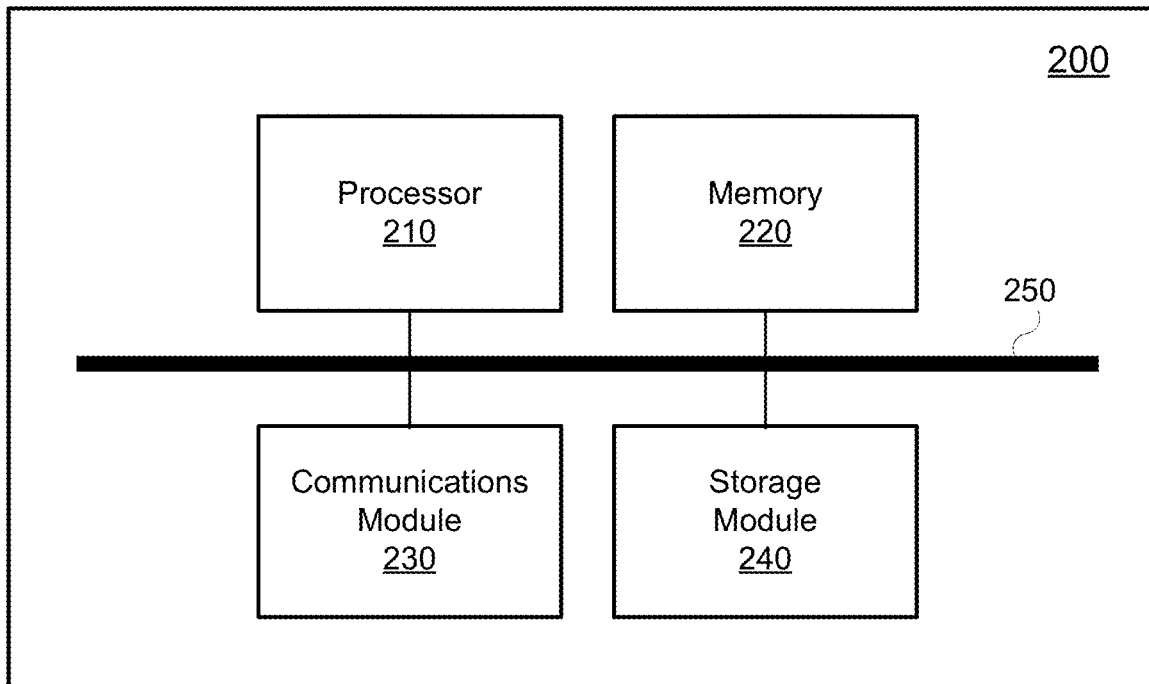
FIG. 2 is high-level schematic diagram of an example computing device.

The remote computing devices 150, the server 160 and the third party servers 170a, 170b, 170c are computing devices. Referring now to FIG. 2, a high-level operation diagram of an example computing device 200 will now be described. The example computing device 200 may be exemplary of the remote computing device 150, the server 160 and/or one or more of the third party servers 170a, 170b, 170c.

The example computing device 200 includes a variety of modules. For example, as illustrated, the example computing device 200 may include a processor 210, a memory 220, a communications module 230, and/or a storage module 240. As illustrated, the foregoing example modules of the example computing device 200 are in communication over a bus 250.

The processor 210 is a hardware processor. The processor 210 may, for example, be one or more ARM, Intel x86, PowerPC processors or the like.

The memory 220 allows data to be stored and retrieved. The memory 220 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computing device 200.

The communications module 230 allows the example computing device 200 to communicate with other computing devices and/or various communications networks. For example, the communications module 230 may allow the example computing device 200 to send or receive communications signals. Communications signals may be sent or received according to one or more protocols or according to one or more standards. For example, the communications module 230 may allow the example computing device 200 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 230 may allow the example computing device 200 to communicate using near-field communication (NFC), via Wi-Fi™, using Bluetooth™ or via some combination of one or more networks or protocols. In some embodiments, all or a portion of the communications module 230 may be integrated into a component of the example computing device 200. For example, the communications module may be integrated into a communications chipset.

The storage module 240 allows the example computing device 200 to store and retrieve data. In some embodiments, the storage module 240 may be formed as a part of the memory 220 and/or may be used to access all or a portion of the memory 220. Additionally or alternatively, the storage module 240 may be used to store and retrieve data from persisted storage other than the persisted storage (if any) accessible via the memory 220. In some embodiments, the storage module 240 may be used to store and retrieve data in a database. A database may be stored in persisted storage. Additionally or alternatively, the storage module 240 may access data stored remotely such as, for example, as may be accessed using a local area network (LAN), wide area network (WAN), personal area network (PAN), and/or a storage area network (SAN). In some embodiments, the storage module 240 may access data stored remotely using the communications module 230. In some embodiments, the storage module 240 may be omitted and its function may be performed by the memory 220 and/or by the processor 210 in concert with the communications module 230 such as, for example, if data is stored remotely. The storage module may also be referred to as a data store.

Where the example computing device 200 functions as the server 160 of FIG. 1, the storage module 240 may allow the example computing device 200 to access the secure data in the secure storage 180.

Software comprising instructions is executed by the processor 210 from a computer-readable medium. For example, software may be loaded into random-access memory from persistent storage of the memory 220. Additionally or alternatively, instructions may be executed by the processor 210 directly from read-only memory of the memory 220.

The computing device 200 will include other components apart from those illustrated in FIG. 2 and the specific component set may differ based on whether the computing device 200 is operating as the remote computing devices 150, the server 160 or the third party servers 170a, 170b, 170c. For example, the computing device 200 may include one or more input modules, which may be in communication with the processor 210 (e.g., over the bus 250). The input modules may take various forms including, for example, a mouse, a microphone, a camera, a touchscreen overlay, a button, a sensor, etc. By way of further example, the computing devices 200 may include one or more output modules, which may be in communication with the processor 210 (e.g., over the bus 250). The output modules include one or more display modules which may be of various types including, for example, liquid crystal displays (LCD), light emitting diode displays (LED), cathode ray tube (CRT) displays, etc. By way of further example, the output modules may include a speaker.

Figure 3:
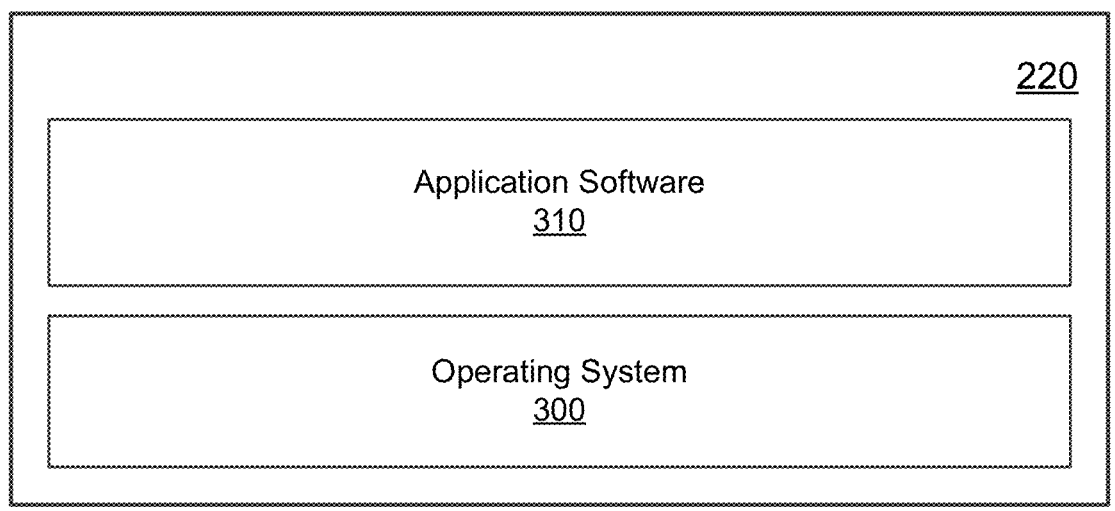
FIG. 3 shows a simplified organization of software components stored in a memory of the example computing device of FIG. 2.

FIG. 3 depicts a simplified organization of software components stored in the memory 220 of the example computing device 200 (FIG. 2). As illustrated, these software components include an operating system 300 and an application 310.

The operating system 300 is software. The operating system 300 allows the application 310 to access the processor 210 (FIG. 2), the memory 220, and the communications module 230 of the example computing device 200 (FIG. 2). The operating system 300 may be, for example, Google™ Android™, Apple™ iOS™, UNIX™, Linux™, Microsoft™ Windows™, Apple OSX™ or the like.

The application 310 adapts the example computing device 200, in combination with the operating system 300, to operate as a device performing a particular function. For example, the application 310 may cooperate with the operating system 300 to adapt a suitable embodiment of the example computing device 200 to operate as the remote computing devices 150, the server 160 and the third party servers 170a, 170b, 170c.

While a single application 310 is illustrated in FIG. 3, in operation the memory 220 may include more than one application 310 and different applications 310 may perform different operations. For example, in at least some embodiments in which the computing device 200 is functioning as one of the remote computing devices 150, the applications 310 may include a value transfer application which may, for example, be a personal banking application. The value transfer application may be configured for secure communications with the server 160 and may provide various banking functions such as, for example, the ability to display a quantum of value in one or more accounts (e.g., display balances), configure transfers of value (e.g., bill payments and other transfers), and other account management functions. The value transfer application may allow data sharing with third party servers to be configured. The remote computing device 150 may also include a PFM application which may configure the remote computing device 150 for communications with at least one of the third party servers 170a, 170b, 170c.

Figure 4:
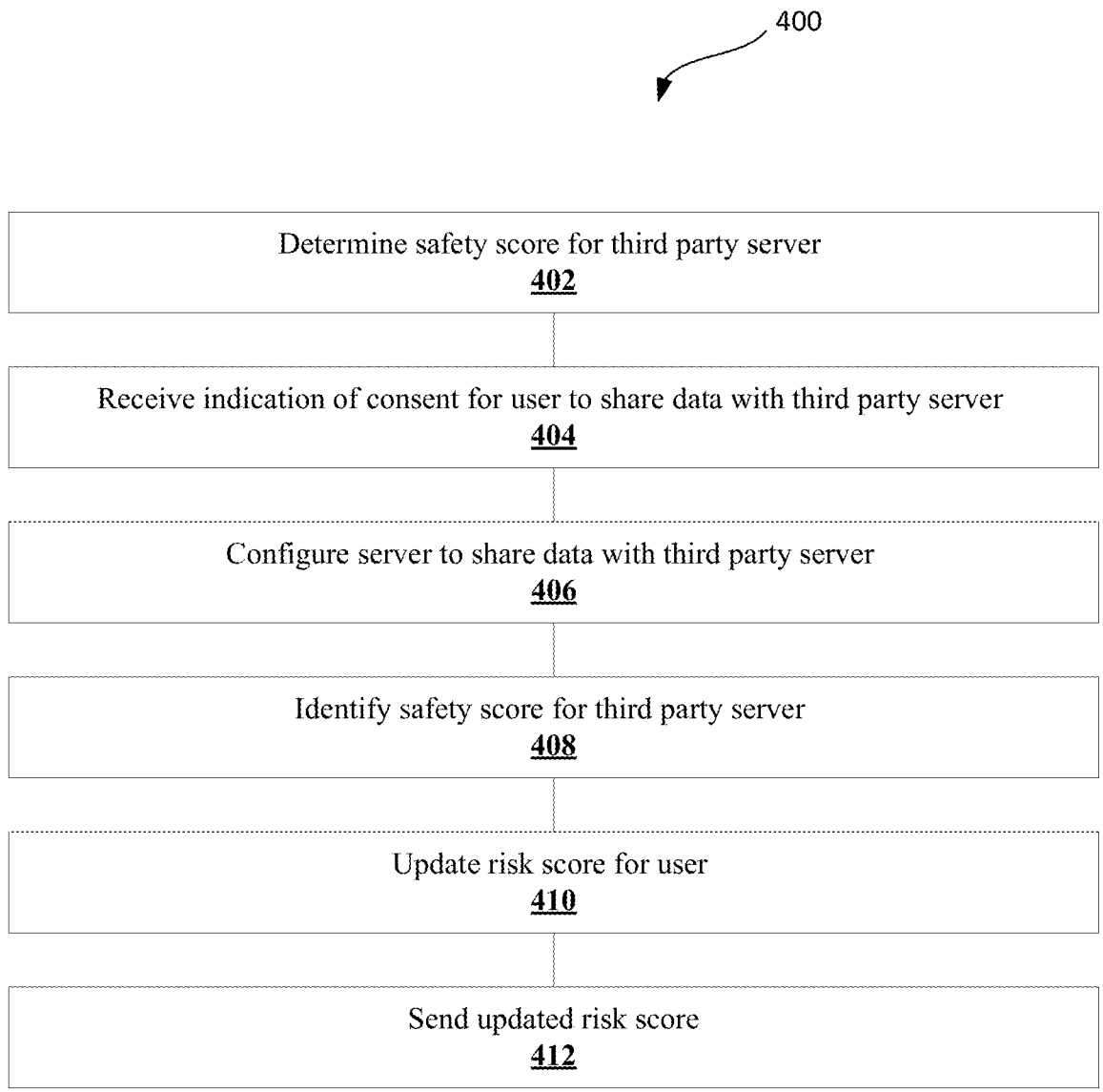
FIG. 4 is a flowchart showing operations performed by a server in accordance with example embodiments of the present disclosure.

Operations performed by the remote computing device 150, the server 160 and a third party server 170a, 170b, 170c will be described below with reference to FIGS. 4-13. Referring first to FIG. 4, a flowchart showing example operations is illustrated.

FIG. 4 is a flowchart showing operations performed by a server 160. The operations may be included in a method 400 which may be performed by the server 160. For example, computer-executable instructions stored in memory of the server 160 may, when executed by a processor of the server 160, configure the server 160 to perform the method 400 or a portion thereof.

At operation 402, a server may determine a safety score for a third party server. The safety score is a metric which represents the perceived risk associated with the third party server. The safety score may be a numerical value that is relative to an associated scale. That is, there may be a value representing the maximum possible safety score (e.g., 100) and another value representing the minimum possible safety score (e.g., 0) and the safety score may be within a range defined by these values. A higher safety score may represent a higher degree of safety or a lower safety score may represent a higher degree of safety.

The safety score may be or may include various scores. For example, the safety score may be determined by the server 160 based on any one or a combination of: a data minimization score associated with the third party server; a privacy score associated with the third party server; an audit score associated with the third party server, or a data breach score associated with the third party server.

The privacy score may be determined by the server 160 based on various factors. For example, the privacy score may be a score that is based on a degree to which the third party is transparent about consent or the level of adherence to such consent. For example, when users (also referred to herein as entities) consent to have their data shared with a third party (which will be described below), the consent that is provided may have associated terms. For example, the user may consent to have their data shared with the third party itself but may not consent to allow the third party to share or sell such data to other third parties. The privacy score may represent the degree to which the third party adheres to such consent. If, for example, the third party does not have consent to share the data with other third parties but they are found to, nevertheless, share such data with other third parties, the privacy score may be affected. That is, when a granted consent places a restriction on use of data (e.g., that the third party is not to share the date), but the third party is found to be using the data for restricted uses, then that third party may be considered to be risky and the privacy score may be negatively impacted.

Security factors associated with the third party server may also be used to calculate the risk score when data is shared with the third party server. For example, a breach score may be associated with the third party and the breach score may reflect past data leaks or breaches that were associated with the third party. Third parties that have had data leaks or breaches in the past may be considered inherently more risky and granting consent to a third party that is considered risky may affect the risk score more greatly than granting consent to a third party that is considered less risky.

In some embodiments, third parties may be assessed a data minimization score which may also be used in determining the security score. The data minimization score reflects the degree to which a third party minimizes data collection (i.e., minimizes the data that they obtain). For example, the data minimization score may be relatively better for third parties that only obtain data that they actually use. Third parties that obtain more data than is necessary for the purpose that the data is to be used will receive a worse data minimization score than third parties that only obtain what they need. For example, a third party that is obtaining data in order to provide financial management advice may be penalized (in terms of the data minimization score) if they obtain a social insurance number (SIN) since the SIN is not strictly required for their intended purpose. In some embodiments, such as, for example, embodiments in which it may be difficult to determine whether data is actually used by a third party server, the data minimization score may simply based on the amount of data that is obtained by the third party server. For example, the data minimization score may be determined by determining a number of data points retrieved by the third party server. A table or other data structure may associate a number of data points with a data minimization score and the appropriate data minimization score may then be determined by performing a lookup in the table using the number of data points retrieved by the third party server. A higher number of data points may reflect a worse data minimization score. By way of further example, the data minimization score may be a weighted score. For example, weightings may be associated with data types. Data types that are more important, private and/or extensive may have higher weightings than data types that are less important, private and/or extensive.

At least some of the various criteria/sub-scores that are used to obtain the security score may be algorithmically determined by a computing device such as the server. For example, data in accounts could be watermarked to detect security breaches. In one example, third parties may be evaluated using fake accounts. A plurality of fake accounts may be created and data may be shared with a third party using the fake accounts. Various fake accounts may be shared with a third party using various levels of consent. For example, in some embodiments, a fake account may be created for each possible consent permutation for a third party and data for each such account may be shared with the third party using the associated consent permutation. The computing device could then automatically evaluate the third party. For example, the web, dark web, etc. could automatically be searched to detect whether the data was released. When a breach/leak is detected, a security factor or score for the associated third party may be negatively adjusted so that the security score may be worse than it would have been prior to the breach.

Other automated processes may also be employed to evaluate a third party. For example, the data minimization score (described above) may be determined by evaluating the conditions under which data is obtained by the third party. For example, some third parties may only obtain data when an associated application is opened, whereas other third parties may obtain the data periodically. Accordingly, determining whether or not a third party only obtains data when an application is opened may involve determining whether a data request history (i.e., a history of data request) matches a defined pattern. For example, where the data request history suggests that data is pulled daily, it may be determined that the third party retrieves data periodically (as opposed to on an as-needed basis). A third party that only obtains data when an application is opened (and the data is presumably needed) may have a better data minimization score than a third party that obtains data frequently (e.g., hourly, daily, etc.).

Other automated processes may be employed apart from those specifically listed above to evaluate third parties and various scores that numerically represent the results of such evaluations may be stored in memory. At operation 402, these various numbers may be retrieved from memory by the server 160 and used to determine the security score.

Accordingly, at operation 402, the security score may be determined based on any one or more of the underlying factors recited above. For example, various sub-scores (e.g., the data minimization score, data breach score and/or privacy score) may be retrieved from memory and a security score may be determined based on such scores. For example, the security score may be determined as an average or a weighted average of the underlying scores. Other sub-scores or factors apart from those specifically recited above may be used to determine the security score. For example, third parties may also be assessed with an audit score after an audit is conducted of such third parties. The audit may be conducted during onboarding of the third party or at any time thereafter and may consider data handing practices of the third party (e.g., whether they store data domestically, whether they store data in an encrypted format, whether they purge data after use, etc.). The audit score may be used when determining the security score such that third parties that have a better audit score can receive a better security score (i.e., the audit score can be retrieved from memory at operation 402 and used to determine the safety score).

A user of a remote computing device 150 may login to the server 160 and may, after logging in, begin an authenticated session in which the user is considered an authenticated user (which may also be referred to as an authenticated entity). During the authentication process, the remote computing device 150 may send authentication credentials to the server 160 and the server may evaluate such credentials. The authentication credentials may, for example, include a username and password, biometric data, etc. The authentication may occur when a secure application is launched on the remote computing device 150.

After a user has logged into the server 160 to become an authenticated user, at operation 404, the server 160 receives, from the remote computing device 150 and via a communications module, an indication of consent for the authenticated user to share data with a third party server. The indication of consent may be sent by the remote computing device 150 in response to input received through an input interface or module (such as a touchscreen) associated with the remote computing device 150. That is, a user may provide input through a user interface that prompts for input representing consent to provide data to the third party. The indication of consent that is received at the server 160 may be associated with a sharing permission defining a sharing scope. That is, the indication of consent may specify sharing permissions which may, for example, define a type of data that is to be shared with the third party (i.e., one or more data types).

For example, the data types may include one or more of a bank balance, a transaction listing, and personal identification information. A bank balance sharing permission may indicate that the third party is (or is not) permitted to access a bank balance for the authenticated user. A transaction listing sharing permission may indicate that the third party is (or is not) permitted to access a transaction history for the third party (such as a listing of previous transactions). A personal identification information sharing permission may indicate that the third party is (or is not) permitted to access personal identification information associated with the third party. The personal identification information may include any stored personal details associated with the entity including, for example, a home, work or mailing address, contact information such as a messaging address (e.g., an email address) and/or a telephone number, a government issued identifier such as a social insurance number (SIN)/social security number (SSN), and/or driver's license number, a date of birth, an age, etc.

Additionally or alternatively, the sharing permissions may specify one or more restrictions that are to be imposed on the third party. The restrictions may be restrictions on use of the data. For example, the sharing permissions may specify that the third party is not permitted to share data with other third parties.

At operation 406, in response to receiving the first indication of consent, the server 160 may configure the server 160 to share data for the authenticated user with the third party server based on the sharing permission. That is, the server 160 may use the sharing permission associated with the indication and configure the server 160 to implement sharing in accordance with such a sharing permission.

By way of example, at operation 406, the server 160 may issue or cause a token (which may be referred to as an access token) to be issued to a third party computer system. The server 160 may configure the token to enable the token to access only the data that is associated with the authenticated user. That is, the token does not permit the third party server to access any data; only the data for the authenticated user that provided consent. Further, the server 160 may configure the token to enable the token to access only the data of a data type specified by the sharing permissions. For example, if the sharing permissions indicated that a bank balance is to be provided, the token may be configured to allow access to the bank balance.

The token that is issued may allow for the retrieval of data via an API. That is, after the token has been issued the third party may use the token to retrieve data. The data that the third party is permitted to retrieve may be restricted based on the sharing permission.

At operation 408, in response to receiving the indication of consent, the server 160 may identify a safety score associated with the third party server. The safety score may, for example, be the safety score determined at operation 402 and it may be retrieved (at operation 408) from memory at operation 408.

Further in response to receiving the first indication of consent, the server 160 may, at operation 410, update a risk score for the authenticated user based on the identified safety score and the sharing permission. Each user associated with the server 160 may be assigned their own risk score. The risk score may be a value representing a level of risk associated with the user's sharing of data. The risk score may be within a determined range, which may be bounded by a first value representing a maximum possible risk score (e.g., 100) and a second value representing the minimum possible risk score (e.g., 0). A higher risk score may represent a higher risk or a lower risk as the case may be.

The risk score may be initialized to a predetermined value. For example, when a user has not shared any data with third parties, the risk score may be initialized to the maximum possible risk score. As a user shares data (i.e., in response to the indication received at operation 404), the risk score may be modified (i.e., reduced or increased as the case may be) to reflect an increase in risk. The risk score may be modified using any one of a number of techniques. For example, in at least some embodiments, the safety score for the third party may be used to calculate a modifier for the risk score. In some embodiments, the modifier may be the safety score itself. The risk score may, for example, be determined by adding the safety score to the existing risk score.

The risk score may be determined based on the sharing permission. For example, certain data may be considered riskier than other data to share and a data type defined by or associated with the sharing permission may affect the risk score. For example, sharing a bank balance may be considered to be less risky than sharing a full transaction listing. By way of further example, sharing an address (which is often publicly available) may be considered less risky than sharing a social insurance number or another government issued identifier. By way of example, each data type may be associated with a defined value (which may be referred to as a sharing permission risk metric), which may be stored in memory. The sharing permission risk metric represents a level of risk associated with sharing data of an associated data type. The sharing permission risk metric may be within a determined range, which may be bounded by a first value representing a maximum possible level (e.g., 1) and a second value representing the minimum possible level (e.g., 0). A higher sharing permission risk metric may represent a higher risk or a lower risk as the case may be. By way of example, a transaction listing data type may be associated with a sharing permission risk metric of one (1) whereas an address may be associated with a sharing permission risk metric of 0.05. In some instances, where the sharing permission specifies that multiple types of data are to be shared, a combined sharing permission risk metric may be determined based on the sharing permission risk metrics for each of these types of data. For example, in some embodiments, the combined sharing permission risk metric may be determined by selecting the maximum sharing permission risk metric for each of these data types. By way of further example, the combined sharing permission risk metric may be determined as the sum the sharing permission risk metrics for each of the data types that are to be shared.

The sharing permission risk metric or the combined sharing permission risk metric may be used in determining the risk score. For example, the modifier that is determined based on the safety score for the third party may be determined or modified based on the sharing permission risk metric. For example, the sharing permission risk metric may be multiplied by the safety score to yield the modifier and this modifier may then be used to determine the risk score. For example, the modifier may be added to a previous risk score to determine an updated risk score. Other methods of determining a risk score are also possible. In some embodiments, the constituent risk score may be modified by applying a weighting that reflects an amount of use of an application that is associated with the third party. For example, the remote computing device 150 may track the amount of usage of such an application and may provide data reflecting the amount of usage to the server 160. The amount of usage may reflect a count of the total number of times the application is opened, accessed, executed, etc. and/or may by based on a timer which reflects the amount of time in which the application is in use. Third parties associated with commonly used applications may have their risk score adjusted by the weighting to reduce the risk score whereas third parties associated with less commonly used applications may have their risk score adjusted by the weighting to increase the risk score.

After the updated risk score is determined, at operation 412, the server 160 may send, via the communications module, the updated risk score for the authenticated user to the remote computing device for display thereon. The updated risk score may be displayed on a user interface of the remote computing device 150. In at least some embodiments, the updated risk score may indicate both a prior risk score and the updated risk score to highlight the change in risk score to the authenticated user.

Through the use of computing devices which allow for electronic communications, the risk score may be provided from the server 160 to the remote computing device 150 in real-time. That is, immediately in response to input received at the remote computing device 150, the server 160 may be engaged to determine the updated risk score and to cause it to be immediately displayed at the remote computing device 150. Such real-time features may enhance the efficacy of the risk score. For example, if the user receives the score in real-time, they can turn off or modify data sharing before third parties have had an opportunity to retrieve any data. Further, by providing the risk score in real-time, the likelihood of a user being attentive is increased than if the risk score were provided sometime later.

Operations of the method 400 may be repeated. For example, after the risk score has been updated at operation 410, the server 160 may repeat operations 404 to 412 or a portion thereof. For example, in a subsequent iteration of these operations, at operation 404, the server may receive, from the remote computing device and via the communications module, a second indication of consent for the authenticated user to share data with a second third party server. The second indication of consent may be associated with a second sharing permission defining a second sharing scope. The second third party server may be different than the third party server that was specified in the indication received at the first iteration of operation 404 (which may be considered a "first third party server").

In response to receiving the second indication of consent, the server 160 may perform the operations 406 to 412. For example, at operation 406, the server may configure the server to share data with the second third party server based on the second sharing permission. At operation 408, the server 160 may identify a second safety score. The second safety score is associated with the second third party server and may be retrieved from memory at operation 408 (it may have previously been determined in another iteration of operation 402). At operation 410, the server 160 may update the risk score for the authenticated user based on the second safety score associated with the second third party server and the second sharing permission and at operation 412, the server 160 may send, via the communications module, the updated risk score for the authenticated user to the remote computing device for display thereon.

The risk score may be a dynamic score which may be updated whenever consents are granted or revoked or even when underlying conditions associated with previously configured consents change. For example, when a privacy score, data leak or breach score, audit score, data minimization score, etc. changes for a third party that has been granted consent, then the risk score may be automatically updated. Thus, the risk score may be automatically updated when new third parties are granted consent or when various metrics that contribute to score change or when consents change.

Figure 5:
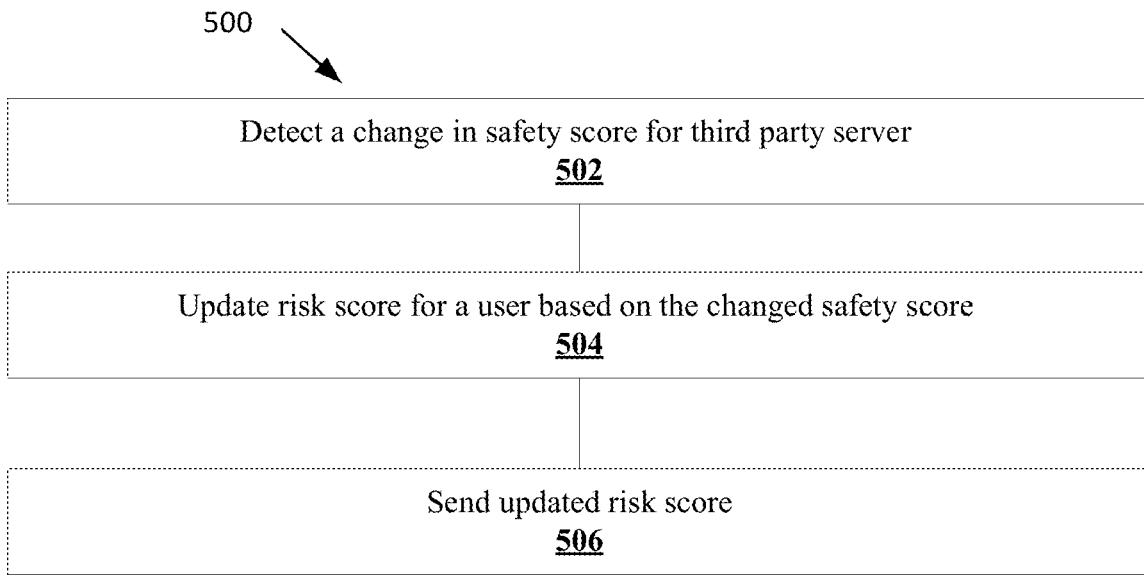
FIG. 5 is a flowchart showing operations performed by a server in accordance with example embodiments of the present disclosure.

Referring now to FIG. 5, a flowchart showing operations performed by a server 160 is illustrated. The operations may be included in a method 500 which may be performed by the server 160 to update an authenticated user's risk score when there is a change in safety score for a third party server that the authenticated user is sharing data with. The method 500 may, for example, be performed after the method 400 of FIG. 4 and the methods 400 and 500 may be performed in a common method.

At operation 502, the server 160 detects a change in the safety score for a third party server. The change in the safety score may be detected, for example, when a sub-score upon which the safety score is based changes. For example, when a privacy score, data leak or breach score, audit score, data minimization score, etc. changes for a third party server, the safety score may be updated and may be considered to be changed for the purposes of operation 502. The updated safety score may be determined in the same manner that the safety score was previously determined (e.g., in the manner described above with reference to operation 402 of the method 400 of FIG. 4).

For example, operation 402 may be performed periodically or in response to a trigger condition in order to maintain a fresh safety score for third parties. When the safety score changes due to a change in an underlying factor associated with the safety score, the server may detect such a change (at operation 502).

At operation 504, in response to detecting the change in the safety score, the server may update the risk score for an affected user (e.g., the authenticated user of the method 400 of FIG. 4) based on the changed safety score. For example, the server 160 may identify any users that have consented to share data with the third party server associated with the changed safety score. Identifying any users that have consented to share data with the third party server may include identifying any users having accounts that are currently configured for data sharing with the third party server. Identifying any users that have consented to share data with the third party server may also, in some embodiments, include identifying any users having accounts that were previously configured for data sharing with the third party server but which are not currently configured for data sharing with the third party server. That is, even if a user is not currently sharing data with the third party server but was previously sharing data with the third party server, that user may be identified so that their risk score can be updated to account for any increase or decrease in risk associated with such past sharing.

The updating of the risk score may be performed in the manner described above with respect to operation 410 of the method 400 of FIG. 4, except that the risk score determined at operation 504 considers the updated safety score. For example, the server 160 may re-determine the modifier described above with respect to operation 410 and may adjust the risk score based on the re-determined modifier.

The updating of the risk score may occur for all affected users. For example, as noted above, the server 160 may identify affected users and the updating may be performed independently for each user.

After the risk score has been updated, the server 160 may send (at operation 506), via a communications module, an updated risk score to a remote computing device associated with each affected user. The remote computing device may, upon or after receiving the updated risk score, display the updated risk score on a display.

The sending and/or display of the updated risk score may occur immediately in response to determining the updated risk score or may occur later in response to a trigger condition. For example, in some embodiments, the updated risk score may be sent from the server 160 to a remote computing device 150 after a user has logged into an associated application on the remote computing device 150 (i.e., after the user has shown that they are an authenticated user by authenticating themselves with one or more credentials).

In a variation of the above-described method, some operations may only occur when a change in the safety score and/or risk score are determined to be sufficiently different. One or more thresholds may be used to evaluate such sufficiency. By way of example, in one possible scenario, a change in the safety score for a third party server may occur but the difference between a prior safety score and the new safety score may be less than a threshold which may suggest that the change is not significant enough to re-determine risk scores for all affected users. If, however, the difference between a prior safety score and the new safety score was greater than the threshold, the server 160 may proceed to operations 504 and 506.

In another variation, one or more of the operations may be performed in response to a detected trigger condition. For example, operations 502, 504 and/or 506 may be performed when a preconfigured trigger condition is observed. The trigger condition may include, for example, initiation of an authenticated session by a user on a remote computing device 150 and/or requesting to access a user interface on a remote computing device 150 that is configured to display a risk score and/or the safety score. For example, when a user logs into the server 160, their risk score may be updated to account for any changes since their last login.

Figure 6:
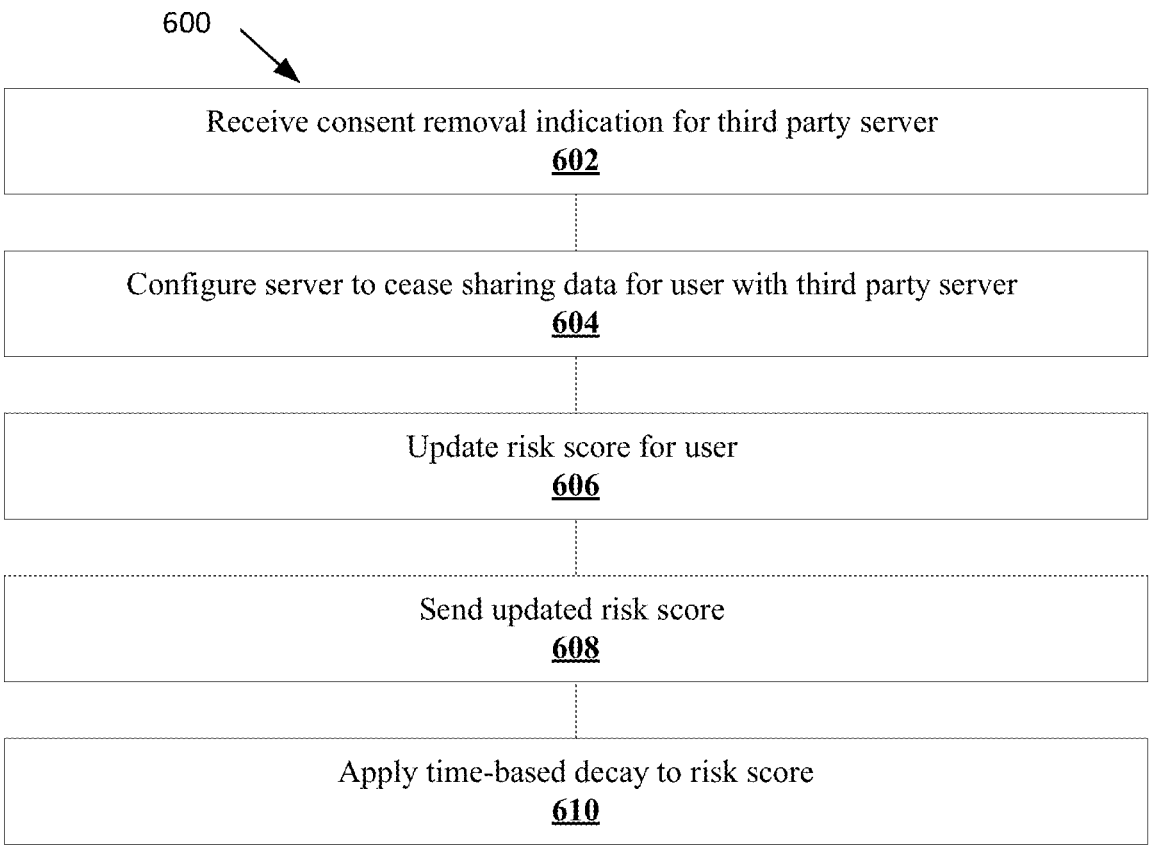
FIG. 6 is a flowchart showing operations performed by a server in accordance with example embodiments of the present disclosure.

Referring now to FIG. 6, a flowchart showing operations performed by a server 160 is illustrated. The operations may be included in a method 600 which may be performed by the server 160 to update an authenticated user's risk score when a user removes consent to share data with a third party server. The method 600 may, for example, be performed after one or more of the methods 400 of FIG. 4 and 500 of FIG. 5 and any combination of the methods 400, 500 and 600 may be performed in a common method.

At operation 602, the server receives, from a remote computing device and via a communications module, a consent removal indication for the third party server. That is, the server receives a signal indicating a request to remove data sharing for a third party server (such as the third party server for which data sharing was configured at operation 406 of the method 400 of FIG. 4. The request may be sent from the remote computing device in response to user input received through an input module or interface associated with the remote computing device. For example, a display associated with the remote computing device may display a user interface which is configured for receiving such input.

The consent removal indication may be received from an authenticated user (e.g., a user that has logged into the server 160) and the server 160 may associate the consent removal indication with a specific user.

At operation 604, in response to receiving the consent removal indication for the third party server, the server 160 may configure the server 160 to cease sharing the data for the authenticated user with that third party server. For example, the server 160 may revoke a token that permitted the third party server to access the data. The token may, for example, be revoked by configuring a token database associated with the server to remove the token so that the token becomes invalid.

At operation 606, in response to receiving the consent removal indication for the third party server, the server 160 may update the risk score for the authenticated user to account for the consent removal indication. That is, the risk score may be re-determined and the updated risk score may reflect a lower risk than the previous risk score. Updating the risk score for the authenticated user to account for the consent removal indication may not revert the risk score back to the level before data was shared with the third party server (i.e., before the indication of consent at operation 404 was received which caused the risk score to be updated at operation 410 based on first safety score and the sharing permission). That is, removing data sharing for a third party may not have a cancelling effect on the risk score for any added risk that was associated with sharing data with that third party. Since data may have already been released to the third party, the user is already more exposed to data risk than they were prior to such release and the risk score may reflect that.

As time elapses, at least some data may become stale and less relevant. For example, transaction data associated with an account that is two years old may be associated with less risk than fresh transaction data. The server 160 may adjust the risk score over time to account for such freshness factors. For example, after data sharing has ceased (at operation 604), the server 160 may at operation 610 apply a time-based decay to the risk score since any data released to the third party server becomes increasingly stale with the passage of time.

Variations of the method 600 are contemplated. For example, in some instances, the consent removal indication may not require complete removal of data sharing with the third party server. Instead, the consent removal indication may modify sharing permissions. For example, the request may indicate that data of a certain data type that was previously shared should no longer be shared. In such circumstances, rather than ceasing the sharing of data at operation 604, the server 160 may simply modify sharing permissions. In some instances, a new token may be issued or, in some instances, permissions associated with an existing token that was issued to the third party server may be modified. In any event, the risk score may be updated at operation 606 to account for the modification. The updated risk score may then be sent at operation 608 and a time-based decay may be applied at operation 610 (assuming the modification reduced risk rather than increased risk).

The methods 400, 500, 600 described above may be varied. For example, in at least some embodiments, the server 160 may generate a preview risk score before consent to share with a third party server is provided and may send the preview risk score to the a remote computing device 150 to highlight, to a user of the remote computing device, the effect of sharing data with the third party server. The preview risk score may be displayed on the remote computing device 150 to communicate to the user how the risk score will be affected by sharing data with the third party. The preview risk score may be expressed as an absolute value (i.e., your risk score will be X if you share data with this server) or as a relative value (i.e., your risk score will increase by Y if you share data with this server). Notably, through the use of a computing device, the preview risk score may be provided in real time.

Reference will now be made to FIGS. 7 to 11 which illustrate user interfaces that may be displayed at the remote computing device 150. The user interfaces may be generated based on data received from the server 160 such as data referred to herein.

Figures 7, 8:
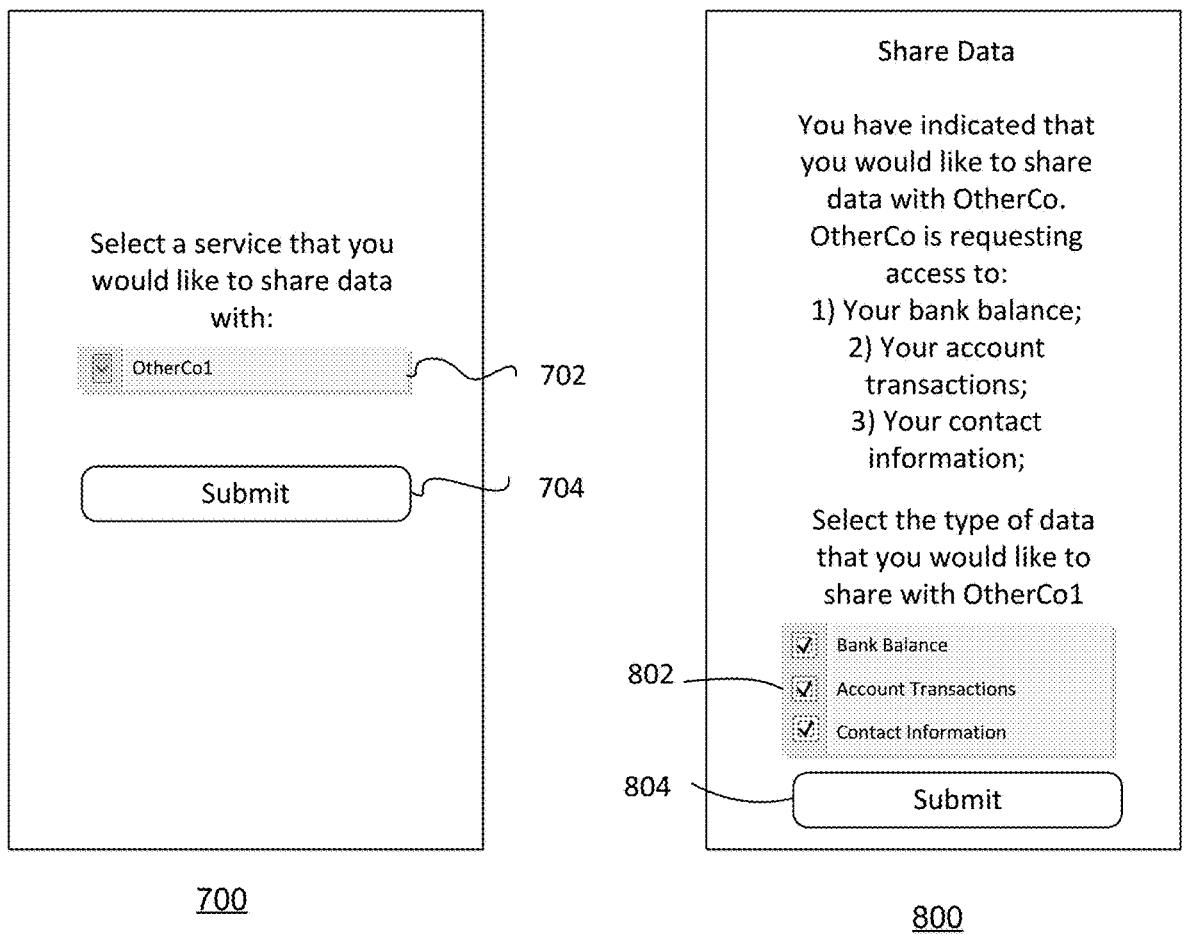
FIG. 7 is an example user interface in accordance with example embodiments of the present disclosure.
FIG. 8 is an example user interface in accordance with example embodiments of the present disclosure.

Referring first to FIG. 7, a user interface 700 is displayed. The user interface 700 may be displayed on a display of a remote computing device 150. The user interface 700 includes an interface element 702 for receiving input selecting a third party server for data sharing. The interface element 702 may allow a user to select from a plurality of supported third party servers. The user interface 700 may include a search feature (not illustrated) such as a search bar for assisting in locating a third party server for data sharing. The server 160 may assist with the search operations (e.g., by receiving an input, identifying matching servers, and responding with search results such as a filtered list).

The user interface 700 also includes an interface element 704 for confirming the selection. By way of example, the interface element 704 may be a virtual button, which is illustrated as a "Submit" button in the example.

The interface element 704 for confirming the selection may function to cause the remote computing device 150 to send a message to the server 160. The message may, for example, be the indication of consent for a user to share data with the third party server referred to above with respect to operation 404 of the method 400 of FIG. 4.

Referring now to FIG. 8, a user interface 800 is displayed. The user interface 800 may be displayed on a display of a remote computing device 150. The user interface 800 includes an interface element 802 for receiving input of one or more sharing permissions. For example, the sharing permissions may specify one or more data types that are to be shared. In the example illustrated, the data types include a bank balance, account transactions, and contact information. However, other data types may be listed in other embodiments. In at least some embodiments, the sharing permissions are selected based on a selected third party server. That is, the sharing permissions may vary based on which third party server is selected. For example, a first third party server may request access to a first set of data types while a second third party server may request access to a second set of data types which is different than the first set of data types. The data types that a particular third party server requests may be determined by the server 160 based on a message received from the third party server. For example, the third party server may send the server 160 a message identifying which data types that third party server is interested in. In the example, illustrated, the data types that a third party server would like to access are used to generate the interface element 802 for receiving input of one or more sharing options. For example, only the data types that the third party server is interested in are listed. In at least some embodiments, these data types may be preselected but the interface element 802 may allow a user to deselect such data types.

The user interface 800 also includes an interface element 804 for confirming the selection. By way of example, the interface element 804 may be a virtual button, which is illustrated as a "Submit" button in the example.

The interface element 804 for confirming the selection may function to cause the remote computing device 150 to send a message to the server 160. The message may, for example, be the indication of consent for a user to share data with the third party server referred to above with respect to operation 404 of the method 400 of FIG. 4. The message may specify the sharing permissions defined using the interface element 802.

The server 160 may, in response to receiving the message that was sent by the remote computing device 150 upon receiving selection of the interface element 804, perform other operations of the method 400 of FIG. 4. For example, the server 160 may perform operations 406-412 and the remote computing device 150 may receive the updated risk score in real time and may present the updated risk score in real time on a display. For example, a user interface 1000 (FIG. 10 may be displayed).

As noted above, before operation 406 is performed and data is shared, the server 160 may determine a preview risk score. For example, the server 160 may, in response to receiving the message that was sent by the remote computing device 150 upon receiving selection of the interface element 804, determine a preview risk score (e.g., by performing operation 410 of the method 400 of FIG. 4). Referring now to FIG. 9, an example user interface 900 is illustrated which illustrates a preview risk score (6/10 in the example). In the example, the preview risk score is displayed together with a current risk score. The example user interface 900 includes a selectable interface element for confirming that the user would like to move forward with data sharing with the third party server. If the user indicates that they would like to move forward with data sharing, the server 160 may receive a message and may, in response, perform operation 406 of the method 400 of FIG. 4.

Referring now to FIG. 10, an example user interface 1000 which indicates an updated risk score is illustrated. In the example, the updated risk score is 6/10. The user interface 1000 may include an interface element to remove or modify sharing options (not shown in the example).

Figure 11:
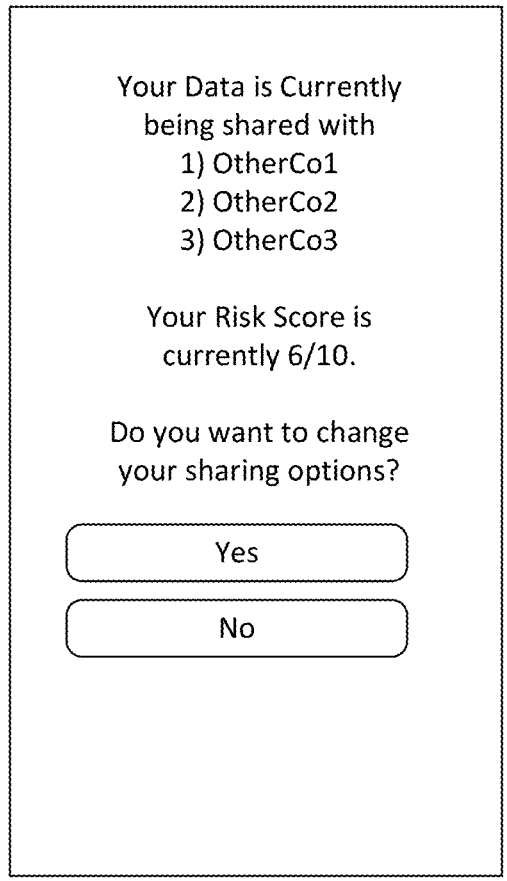
FIG. 11 is an example user interface in accordance with example embodiments of the present disclosure.

Referring now to FIG. 11, an example user interface 1100 for modifying data sharing options is illustrated. The example user interface 1100 includes an indication of a present sharing status (e.g., a listing of third party servers which data is presently shared with) and a current risk score. The example user interface 1100 also includes interface elements for modifying sharing options. The user interface 1100 may, for example, allow for receipt of input representing an instruction to cease sharing data with a third party server or to modify sharing permissions for a third party server. The remote computing device 150 may, in response to input received through the user interface, send a message to the server 160. The message may be the consent removal indication referred above to operation 602 of the method 600 of FIG. 6.

Figure 12:
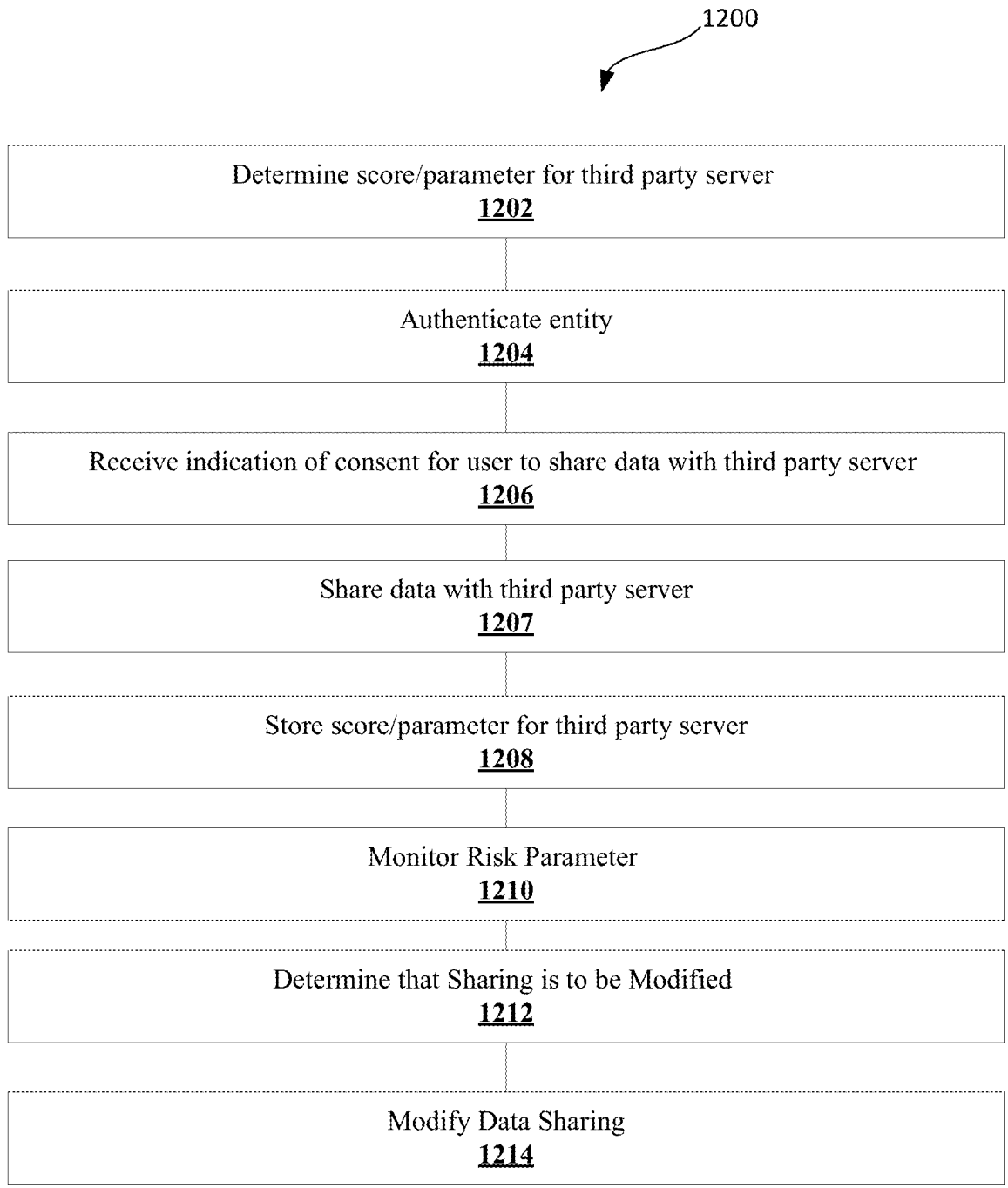
FIG. 12 is a flowchart showing operations performed by a server in accordance with example embodiments of the present disclosure.

Referring now to FIG. 12, an example method showing example operations is illustrated.

FIG. 12 is a flowchart showing operations performed by a server 160. The operations may be included in a method 1200 which may be performed by the server 160. For example, computer-executable instructions stored in memory of the server 160 may, when executed by a processor of the server 160, configure the server 160 to perform the method 1200 or a portion thereof.

At operation 1202, a server may determine a score and/or parameter for a third party server. For example, the server may determine a risk parameter for the third party server. The risk parameter may, for example, be a safety score (which may also be referred to as a risk score) which is a metric which represents a perceived risk associated with the third party server. The safety score may be a numerical value that is relative to an associated scale. That is, there may be a value representing the maximum possible safety score (e.g., 100) and another value representing the minimum possible safety score (e.g., 0) and the safety score may be within a range defined by these values. A higher safety score may represent a higher degree of safety or a lower safety score may represent a higher degree of safety.

The safety score may be or may include various scores. The safety score may, for example, be or include any scores described above with reference to FIG. 4 and, in particular, operations 402, 408, 410 and 412. In at least some embodiments, the safety score may be a combined score that is determined based on a number of sub-scores. For example, the safety score may be determined by the server 160 based on any one or a combination of: a data minimization score associated with the third party server; a privacy score associated with the third party server; an audit score associated with the third party server, or a data breach score associated with the third party server.

The privacy score may be determined by the server 160 based on various factors. For example, the privacy score may be a score that is based on a degree to which the third party is transparent about consent or the level of adherence to such consent. For example, when users consent to have their data shared with a third party (which will be described below), the consent that is provided may have associated terms. For example, the user may consent to have their data shared with the third party itself but may not consent to allow the third party to share or sell such data to other third parties. The privacy score may represent the degree to which the third party adheres to such consent. If, for example, the third party does not have consent to share the data with other third parties but they are found to, nevertheless, share such data with other third parties, the privacy score may be affected. That is, when a granted consent places a restriction on use of data (e.g., that the third party is not to share the date), but the third party is found to be using the data for restricted uses, then that third party may be considered to be risky and the privacy score may be negatively impacted.

Security factors associated with the third party server may also be used to calculate the safety score when data is shared with the third party server. For example, a breach score may be associated with the third party and the breach score may reflect past data leaks or breaches that were associated with the third party. Third parties that have had data leaks or breaches in the past may be considered inherently more risky and granting consent to a third party that is considered risky may affect the safety score more greatly than granting consent to a third party that is considered less risky.

In some embodiments, third parties may be assessed a data minimization score which may also be used in determining the security score. The data minimization score reflects the degree to which a third party minimizes data collection (i.e., minimizes the data that they obtain). For example, the data minimization score may be relatively better for third parties that only obtain data that they actually use. Third parties that obtain more data than is necessary for the purpose that the data is to be used will receive a worse data minimization score than third parties that only obtain what they need. For example, a third party that is obtaining data in order to provide financial management advice may be penalized (in terms of the data minimization score) if they obtain a social insurance number (SIN) since the SIN is not strictly required for their intended purpose. In some embodiments, such as, for example, embodiments in which it may be difficult to determine whether data is actually used by a third party server, the data minimization score may simply based on the amount of data that is obtained by the third party server. For example, the data minimization score may be determined by determining a number of data points retrieved by the third party server. A table or other data structure may associate a number of data points with a data minimization score and the appropriate data minimization score may then be determined by performing a lookup in the table using the number of data points retrieved by the third party server. A higher number of data points may reflect a worse data minimization score. By way of further example, the data minimization score may be a weighted score. For example, weightings may be associated with data types. Data types that are more important, private and/or extensive may have higher weightings than data types that are less important, private and/or extensive.

At least some of the various criteria/sub-scores that are used to obtain the security score may be algorithmically determined by a computing device such as the server. For example, data in accounts could be watermarked to detect security breaches. In one example, third parties may be evaluated using fake accounts. A plurality of fake accounts may be created and data may be shared with a third party using the fake accounts. Various fake accounts may be shared with a third party using various levels of consent. For example, in some embodiments, a fake account may be created for each possible consent permutation for a third party and data for each such account may be shared with the third party using the associated consent permutation. The computing device could then automatically evaluate the third party. For example, the web, dark web, etc. could automatically be searched to detect whether the data was released. When a breach/leak is detected, a security factor or score for the associated third party may be negatively adjusted so that the security score may be worse than it would have been prior to the breach.

Other automated processes may also be employed to evaluate a third party. For example, the data minimization score (described above) may be determined by evaluating the conditions under which data is obtained by the third party. For example, some third parties may only obtain data when an associated application is opened, whereas other third parties may obtain the data periodically. Accordingly, determining whether or not a third party only obtains data when an application is opened may involve determining whether a data request history (i.e., a history of data request) matches a defined pattern. For example, where the data request history suggests that data is pulled daily, it may be determined that the third party retrieves data periodically (as opposed to on an as-needed basis). A third party that only obtains data when an application is opened (and the data is presumably needed) may have a better data minimization score than a third party that obtains data frequently (e.g., hourly, daily, etc.).

In at least some embodiments, a consent scope score may by determined and may be used by the server in determining the privacy score/risk score. The consent scope score is a measure of the degree to which the third party server obtains data that it has consent to obtain. For example, a user may configure data sharing to share more data than the third party server actually needs. For example, the user may consent to sharing of a bank balance and a transaction listing but the third party server may only retrieve the bank balance. In such a scenario, a consent scope score may be negatively affected. In contrast, a server that retrieves all data that it is permitted to retrieve may have a better consent scope score. Other automated processes may be employed apart from those specifically listed above to evaluate third parties and various scores that numerically represent the results of such evaluations may be stored in memory. At operation 1202, these various numbers may be retrieved from memory by the server 160 and used to determine the security score.

Accordingly, at operation 1202, a risk parameter/score may be determined based on any one or more of the underlying factors recited above. For example, various sub-scores (e.g., the data minimization score, data breach score and/or privacy score) may be retrieved from memory and a risk score may be determined based on such scores. For example, the risk score may be determined as an average or a weighted average of the underlying scores. Other sub-scores or factors apart from those specifically recited above may be used to determine the risk score. For example, third parties may also be assessed with an audit score after an audit is conducted of such third parties. The audit may be conducted during onboarding of the third party or at any time thereafter and may consider data handing practices of the third party (e.g., whether they store data domestically, whether they store data in an encrypted format, whether they purge data after use, etc.). The audit score may be used when determining the risk score such that third parties that have a better audit score can receive a better risk score (i.e., the audit score can be retrieved from memory at operation 1202 and used to determine the safety score).

A user of a remote computing device 150 may login to the server 160 (at operation 1204) and may, after logging in, begin an authenticated session in which the user is considered an authenticated user (which may also be referred to as an authenticated entity). During the authentication process, the remote computing device 150 may send authentication credentials to the server 160 and the server may evaluate such credentials in order to authenticate the user. The authentication credentials may, for example, include a username and password, biometric data, etc. The authentication may occur when a secure application is launched on the remote computing device 150.

After a user has logged into the server 160 to become an authenticated user, at operation 1206, the server 160 receives, from the remote computing device 150 and via a communications module, a signal representing an indication of consent for the authenticated user to share data with a third party server. The indication of consent may be sent by the remote computing device 150 in response to input received through an input interface or module (such as a touchscreen) associated with the remote computing device 150. That is, a user may provide input through a user interface that prompts for input representing consent to provide data to the third party. The indication of consent that is received at the server 160 may be associated with a sharing permission defining a sharing scope. That is, the indication of consent may specify sharing permissions which may, for example, define a type of data that is to be shared with the third party (i.e., one or more data types).

For example, the data types may include one or more of a bank balance, a transaction listing, and personal identification information. A bank balance sharing permission may indicate that the third party is (or is not) permitted to access a bank balance for the authenticated user. A transaction listing sharing permission may indicate that the third party is (or is not) permitted to access a transaction history for the third party (such as a listing of previous transactions). A personal identification information sharing permission may indicate that the third party is (or is not) permitted to access personal identification information associated with the third party. The personal identification information may include any stored personal details associated with the entity including, for example, a home, work or mailing address, contact information such as a messaging address (e.g., an email address) and/or a telephone number, a government issued identifier such as a social insurance number (SIN)/social security number (SSN), and/or driver's license number, a date of birth, an age, etc.

Additionally or alternatively, the sharing permissions may specify one or more restrictions that are to be imposed on the third party. The restrictions may be restrictions on use of the data. For example, the sharing permissions may specify that the third party is not permitted to share data with other third parties.

At operation 1207, in response to receiving the indication of consent, the server 160 may configure the server 160 to share data for the authenticated user with the third party server based on the sharing permission. That is, the server 160 may use the sharing permission associated with the indication and configure the server 160 to implement sharing in accordance with such a sharing permission.

By way of example, at operation 1207, the server 160 may issue or cause a token (which may be referred to as an access token) to be issued to a third party computer system. The server 160 may configure the token to enable the token to access only the data that is associated with the authenticated user. That is, the token does not permit the third party server to access any data; only the data for the authenticated user that provided consent. Further, the server 160 may associate the token with access permissions. The access permissions may, for example, be based on the sharing permissions specified in the indication of consent. The server 160 may enable the token to access only the data of a data type specified by the sharing permissions. For example, if the sharing permissions indicated that a bank balance is to be provided, the token may be configured to allow access to the bank balance.

The access permissions associated with the token may specify one or more data types that the third party server is permitted to access and/or one or more data types that the third party server is not permitted to access. Put differently, the access permissions may define a whitelist of datatypes or a blacklist of datatypes. The access permissions may take other forms.

The token that is issued may allow for the retrieval of data via an API. That is, after the token has been issued the third party server may use the token to retrieve data.

Accordingly, at operation 1207, the server 160 may, in response to receiving the indication of consent, issue an access token to the third party server. The access token may be for accessing data associated with the authenticated entity.

At operation 1208, in response to receiving the indication of consent, the server 160 may store a score and/or parameter associated with the third party server. The score/parameter may represent a level of risk or safety associated with the third party server at the time the consent is provided. The score/parameter may be the risk parameter/safety score determined at operation 1202.

The score/parameter may be stored, by the server 160 in association with the authenticated entity. For example, the score/parameter may be stored in an account or profile associated with the authenticated entity. The score/parameter is associated with the third party server. Based on the score/parameter, the server 160 is able to track a "consented score/parameter". That is, the server keeps track of the score/parameter at the time the indication of consent was received.

While operation 1202 is illustrated in FIG. 12 prior to operation 1206, in at least some embodiments, operation 1202 may be performed after operation 1206. For example, in at least some embodiments, operation 1202 may be performed in response to receiving the indication of consent at operation 1206.

Also in response to receiving the indication of consent, at operation 1210, the server 160 monitors a risk parameter associated with one or both of the third party server and the authenticated entity to detect a change in the risk parameter.

For example, the risk parameter/score determined at operation 1202 may be re-determined at operation 1210 in the manner described at operation 1202 in order to determine whether the score/parameter has changed. In at least some embodiments, the re-determined risk parameter/score may be adjusted to reflect usage of an application associated with the third party server by the entity that is sharing data with that third party server. For example, the remote computing device 150 or the third party server may track the amount of usage of such an application and may provide data reflecting the amount of usage to the server 160. Such data may, in at least some embodiments, be required to be provided as a condition for data sharing. The amount of usage may reflect a count of the total number of times the application is opened, accessed, executed, etc. and/or may by based on a timer which reflects the amount of time in which the application is in use. Third party servers associated with commonly used applications may have their risk score adjusted to reflect a reduced risk whereas third party servers associated with less commonly used applications may have their risk score adjusted to reflect a greater risk. In some implementations, if the server determines that the application has not been used for at least a threshold period of time, it may disable data sharing for the associated entity/user with the third party server.

To determine whether the score/parameter has changed, the server may retrieve the stored score/parameter. That is, the server may retrieve the score/parameter that was stored at operation 1208 and may compare the stored score/parameter with the newly-determined score/parameter.

When the score/parameter is determined to have not changed, the subsequent operations of the method 1200 may not be performed. The server may continue monitoring (i.e., may continue to perform operation 1210). When the server 160 detects a change in the parameter/score, control flow may proceed to operation 1212. In at least some embodiments, the change may need to be sufficiently material to be considered a change which causes operation 1212 to be initiated. "Sufficiently material" may be evaluated relative to a threshold. For example, a change of 10% or more to the consented score/parameter may be required for the change to be considered to be sufficiently material.

The evaluation of the parameter/score at operation 1210 may occur periodically, continuously and/or in response to detection of a trigger condition.

At operation 1212, the server may determine whether data sharing with a third party server is to be modified based on the change in the risk parameter/score. For example, the server may compare a difference between the score stored at operation 1208 and a current score (i.e., the score determined during operation 1210) to a threshold.

By way of example, in some embodiments, when a risk score, such as a consent scope score, indicates that the third party server is to retrieving all data that it is permitted to retrieve, the server may determine that data sharing with that third party server should be modified to cease sharing of the data that the third party server does not retrieve.

By way of further example, in some embodiments, when a risk score suggests that the third party server's appetite for data has grown, then the server may determine that data sharing is to be modified. For example, if the third party server previously only accessed a certain type of data or previously accessed data infrequently but that third party server begins accessing another type of data or accessing data frequently, the server may determine that the third party server has become riskier and may take action to attempt to limit data sharing with the third party server.

Other scenarios that may affect the risk score in a way that causes data sharing to be modified may, for example, include a detected data breach. It will be understood that any of the factors recited above that negatively impact the risk score may affect the risk score in a manner that causes the server to determine that data sharing is to be modified. The determination at operation 1212 may be based on input received from the authenticated entity. In some embodiments, when the server 160 detects the change in the risk parameter/score, the server 160 may send, to the remote computing device, a selectable option to modify a data sharing option associated with the third party server. The server 160 may, for example, send the selectable option in a message or notification which may be delivered, for example, through an application, such as a value transfer application (such as a banking application), residing on the remote computing device.

The remote computing device may, in response to receiving the message or notification, update a display. For example, a notification such as "You are currently sharing data with ABC. We notice that ABC's has gotten more risky lately. Do you still want to share data with ABC" may be displayed. The notification may, in some embodiments, indicate the consented score/parameter and/or the updated score/parameter. The notification may, in some embodiments, include or provide an option to retrieve details about reasons for the change in the score/parameter.

The remote computing device may, in response to receiving the notification or message, include, on the display, the selectable option. The selectable option may, for example, ask a user to confirm that they would like to continue sharing data with the third party server and/or to confirm that they do not wish to continue sharing data with the third party server.

The server 160 may receive a signal from the remote computing device. The signal may indicate selection of the selectable option. The indication of the selectable option may be used by the server at operation 1212. For example, the signal indicating selection of the selectable option may be the input received from the authenticated entity that is used (at operation 1212) to determine that data sharing with the third party server is to be modified.

Accordingly, in at least some embodiments, at operation 1212, the determination may be made based on input received directly from the authenticated entity. If the input indicates that the third party server should be prevented from further accessing the data, then the server may determine that data sharing with the third party server is to be modified (at operation 1212). If, however, the input indicates that sharing should continue without modification, then the server may determine, at operation 1212, that data sharing with the third party server is not to be modified. If the input indicates that data sharing with the third party server is to continue but that sharing permissions should be modified, then the server 160 determines at operation 1212 that data sharing with the third party server is to be modified.

In some embodiments, the input received from the authenticated entity may not be input received after a change in risk score/parameter is detected (at operation 1210). Instead, the input may be received earlier and stored by the server 160. For example, during an authenticated session (i.e., after the entity has been authenticated to the server) with a remote computing device, the server may receive and store one or more preferences. The preferences may be provided, for example, through an application residing on the remote computing device, such as a value transfer application and may be received at the server 160 from the remote computing device. The preferences may be stored, for example, in an account or profile associated with the authenticated entity and may be retrieved at operation 1212. Accordingly, determining that data sharing with a third party server is to be modified may include retrieving the stored risk profile for the authenticated entity.

The preference may, for example, indicate one or more conditions for revocation or modification of data sharing. For example, the preferences may define one or more conditions which, when detected, are to cause data sharing to be automatically revoked or modified. By way of example, the preferences may specify that access to data should be revoked in the event of a data breach. The determination of whether data sharing is to be modified may, therefore, be based on one or more conditions for revocation or modification specified in the preferences. The conditions may, for example, specify that data sharing is to be modified when any one or combination of the following occurs: the server determining that a data breach associated with the third party server has occurred; the server determining that an application associated with the third party server has not been used for at least a predetermined period of time; the server determining that a score associated with the third party server has changed by at least a predetermined amount; the server determining that data access by the third party server has changed; the server determining that a third party server is not accessing at least some data that the server is configured to share with the third party server; and/or the server determining that the third party server is accessing data that is not required by the third party server. In some embodiments, one or more of these conditions may be system-defined conditions rather than entity-defined preferences.

By way of further example, in at least some embodiments, the preferences may specify or be associated with a threshold. The threshold may represent, for example, a threshold for a score or parameter. By way of example, preferences may specify that data sharing is to be revoked or modified if a third party server's risk score/parameter falls below the specified threshold. The determination of whether data sharing is to be modified at operation 1212 may be based on the threshold. For example, if the risk score/parameter falls below the threshold, the server may determine that data sharing is to be revoked at operation 1212.

In some embodiments, the preference may specify, for example, a risk tolerance or level for the user. For example, a user may specify whether they have a "high", "medium" or "low" tolerance for risk. Each level may be associated with its own rules or conditions. In at least some embodiments, each level may have an associated range of acceptable scores/parameters and, if the third party server's score/parameter changes so as to no longer fit within a range associated with the entity's tolerance level, then the server may determine at operation 1212 that data sharing is to be automatically modified.

When the server determines that data sharing is to be modified, the server 160 at operation 1214 modifies the sharing of data for the authenticated entity with the third party server. Such modification may be performed by revoking the access token or by modifying an access permission associated with the access token. Revocation may, for example, cause the token to become invalid. Modification of access permissions may allow the third party server to retrieve some data, but to a lesser than extent than prior to the modification. The amount and/or type of data to be shared after the modification may be based, for example, on the stored preferences and/or the input received from the remote computing device.

In some embodiments, the server 160 may determine whether data sharing is to be revoked or modified based on a type associated with a detected condition. That is, the server may determine the nature of a condition which caused the risk parameter/score to be changed and may take action depending on the type of such a condition. The conditions may include, for example: occurrence of a data breach by the third party server; non-use of an application associated with the third party server for at least a threshold period of time; detecting a change in data access by the third party server; non-access of data by the third party server; and/or attempt, by the third party server, to access data not required by the third party server.

The server 160 may, for example, revoke access for certain conditions (e.g., data breach, non-use of application) but may only modify access for certain conditions (e.g., non-access of a certain type of data by the third party server may cause the server to remove that type of data from the sharing permissions).

While not illustrated in FIG. 12, in at least some embodiments, the server 160 may, after detecting the change in a risk parameter (at operation 1210), provide, to the remote computing device associated with the authenticated entity, a suggestion for a replacement of the third party server. For example, the server 160 may maintain category data for third party servers, including the third party server for which data sharing has been configured. The server 160 may identify, based on category data associated with the third party server, an alternative third party server. For example, the server may identify another third party server in the same category as the third party server. By way of example, if the third party server associated with the risk score/parameter is a personal financial manager, then the server may identify another personal financial manager. Then, the server may send, to the remote computing device, a notification. The notification may suggest replacement of the third party server with the alternative third party server. The remote computing device displays the notification. The notification may include a selectable option to switch to the alternative third party server. The server may receive a signal indicating selection of such a selectable option and may, in response, configure data sharing with the alternative third party server.

Accordingly, in at least some embodiments, the server 160 may modify data sharing when a risk parameter/score associated with the third party server changes. In some embodiments, the modification of data sharing may occur when a preference for an entity changes so that a risk profile for the third party server is no longer compliant with the updated preference. An example of such a method is illustrated, in flowchart form, in FIG. 13.

Figure 13:
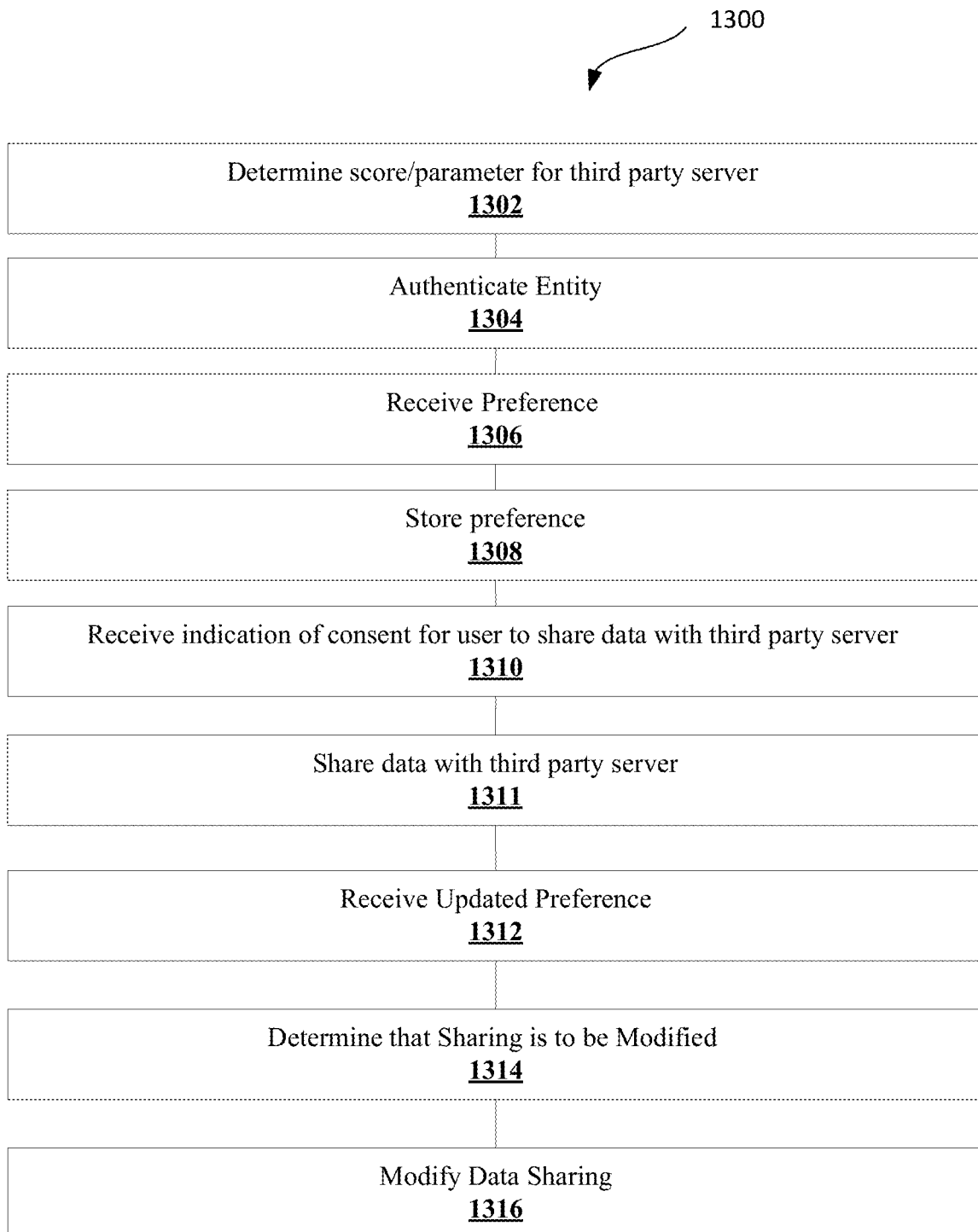
FIG. 13 is a flowchart showing operations performed by a server in accordance with example embodiments of the present disclosure.

Referring briefly to FIG. 13, a flowchart showing operations performed by a server 160 is illustrated. The operations may be included in a method 1300 which may be performed by the server 160. For example, computer-executable instructions stored in memory of the server 160 may, when executed by a processor of the server 160, configure the server 160 to perform the method 1300 or a portion thereof. The method may be performed together with the method 1200 of FIG. 12.

At operation 1302, the server may determine a score and/or parameter for the third party server. Operation 1302 may be performed as described above with reference to operation 1202 of the method 1200 of FIG. 12.

At operation 1304, the server 160 may authenticate the entity. Operation 1304 may be performed as described above with reference to operation 1204 of the method 1200 of FIG. 12.

At operation 1306, the server 160 may receive input from the authenticated entity. The input may specify a preference. The preference may be received from a remote computing device associated with the authenticated entity. The preferences may be provided, for example, through an application residing on the remote computing device, such as a value transfer application and may be received at the server 160 from the remote computing device.

The preference may be of the type described above with reference to the method 1200 of FIG. 12. For example, the preference may specify a risk tolerance or level for the user. For example, a user may specify whether they have a "high", "medium" or "low" tolerance for risk. Each level may be associated with its own rules or conditions. In at least some embodiments, each level may have an associated range of acceptable scores/parameters. Each range may define thresholds or limits. The preference may be specified in other ways apart from "high", "medium" and "low" tolerance levels. For example, in at least some embodiments, the preference may include or specify a threshold. The threshold may represent, for example, a threshold for a score or parameter.

At operation 1308, the server 160 stores the received preferences. The preferences may be stored, for example, in an account or profile associated with the authenticated entity.

At operation 1310, the server 160 receives an indication of consent for a user to share data with the third party server and the server 160 begins sharing such data with the third party server at operation 1311. Operations 1310 and 1311 may be performed as described above with reference to operation 1206 and 1207 of the method 1200 of FIG. 12 respectively.

At some time after data sharing commences, the server 160 may receive (at operation 1312) a further input from the authenticated entity. The further input may include an updated preference.

At operation 1314, the server determines whether data sharing is to be modified based on a change to a risk parameter. Operation 1314 may be performed in a manner similar to operation 1212 of the method 1200 of FIG. 12. However, at operation 1314, the server 160 may evaluate whether data sharing is to be modified due to the update in the preference. More particularly, the server may determine whether a risk profile associated with the third party server (such as the risk score/parameter) is compliant with the updated preference. In at least some embodiments, operation 1314 may include comparing the score/parameter associated with the third party server (e.g., the score/parameter determined at operation 1302) with a threshold associated with the preference.

The server may determine that the third party server is compliant with the updated preference. In this case, the server may not modify data sharing with the third party server. However, in the example of FIG. 13, the server 160 determines that a risk profile associated with the third party server is not compliant with the updated preference and thus, that data sharing is to be modified.

In response to determining that data sharing is to be modified, at operation 1316, the server modifies data sharing. Operation 1316 may be performed in a manner that is the same or similar to operation 1214 of the method 1200 of FIG. 12.

Variations of the embodiments described above are contemplated. For example, in some embodiments, the method 1200 may be modified such that the server 160 automatically modifies data sharing when a change in the parameter/score occurs and sends a notification to the remote computing device to re-consent to data sharing based on the new risk parameter/score.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. A server comprising:
a communications module;
a processor coupled to the communications module; and
a memory coupled to the processor, the memory storing processor-executable instructions which, when executed, configure the processor to:
receive, from a remote computing device and via the communications module, a signal representing an indication of consent for an authenticated entity to share data with a third party server;
in response to receiving the indication of consent, issue an access token to the third party server, the access token for accessing data associated with the authenticated entity;
monitor a risk parameter associated with the third party server to detect a change in the risk parameter; and
responsive to detecting the change in the risk parameter:
identify an alternative third party server;
send, to the remote computing device and via the communications module, a notification that includes a first selectable option to modify a data sharing option associated with the third party server and a second selectable option to replace the third party server with the alternative third party server;
determine, based on a signal received from the authenticated entity indicating selection of the first selectable option, that data sharing with the third party server is to be modified based on the change in risk parameter; and
modify the data sharing for the authenticated entity with the third party server by at least one of revoking the access token and modifying an access permission associated with the access token.

2. The server of claim 1, wherein the instructions further configure the processor to, in response to receiving the indication of consent, store a score associated with the third party server, and wherein determining that the data sharing with the third party server is to be modified based on the change in risk parameter comprises comparing a difference between the stored score and a current score to a threshold, the threshold based on the input received from the authenticated entity.

3. The server of claim 1, wherein the instructions further configure the processor to:
receive the input from the authenticated entity, the input including a preference;
store the preference in the memory;
receive a further input from the authenticated entity, the further input including an updated preference,
and wherein determining, based on input received from the authenticated entity, that data sharing with the third party server is to be modified based on the change in risk parameter comprises determining that a risk profile associated with the third party server is not compliant with the updated preference.

4. The server of claim 1, wherein the determining that data sharing with the third party server is to be modified includes at least one of:
determining that a data breach associated with the third party server has occurred;
determining that an application associated with the third party server has not been used for at least a predetermined period of time;
determining that a score associated with the third party server has changed by at least a predetermined amount;
determining that data access by the third party server has changed;
determining that the third party server is not accessing at least some data that the server is with the third party server; and
determining that the third party server is accessing data that is not required by the third party server.

5. The server of claim 1, wherein the alternative third party server is identified based on category data associated with the third party server.

6. The server of claim 1, wherein determining that data sharing with the third party server is to be modified comprises retrieving a stored risk profile for the authenticated entity.

7. The server of claim 1, wherein modifying the sharing of data with the third party server comprises revoking the access token.

8. The server of claim 1, wherein modifying the sharing of data with the third party server comprises modifying the access permission associated with the access token.

9. The server of claim 1, wherein the instructions further configure the processor to:
determine, based on a type associated with a detected condition, whether access to data is to be revoked or reduced.

10. A method comprising:
receiving, from a remote computing device and at a server, a signal representing an indication of consent for an authenticated entity to share data with a third party server;
in response to receiving the indication of consent, issuing an access token to the third party server, the access token for accessing data associated with the authenticated entity;
monitoring a risk parameter associated with the third party server to detect a change in the risk parameter; and
responsive to detecting the change in the risk parameter:
identifying an alternative third party server;
sending, to the remote computing device, a notification that includes a first selectable option to modify a data sharing option associated with the third party server and a second selectable option to replace the third party server with the alternative third party server;
determining, based on a signal received from the authenticated entity indicating selection of the first selectable option, that data sharing with the third party server is to be modified based on the change in risk parameter; and
modifying the data sharing for the authenticated entity with the third party server by at least one of revoking the access token and modifying an access permission associated with the access token.

11. The method of claim 10, further comprising:
in response to receiving the indication of consent, storing a score associated with the third party server,
and wherein determining that the data sharing with the third party server is to be modified based on the change in risk parameter comprises comparing a difference between the stored score and a current score to a threshold, the threshold based on the input received from the authenticated entity.

12. The method of claim 10, further comprising:
receiving the input from the authenticated entity, the input including a preference;
storing the preference;
receiving a further input from the authenticated entity, the further input including an updated preference,
and wherein determining, based on input received from the authenticated entity, that data sharing with the third party server is to be modified based on the change in risk parameter comprises determining that a risk profile associated with the third party server is not compliant with the updated preference.

13. The method of claim 10, wherein determining that data sharing with the third party server is to be modified includes at least one of:
   determining that a data breach associated with the third party server has occurred;
   determining that an application associated with the third party server has not been used for at least a predetermined period of time;
   determining that a score associated with the third party server has changed by at least a predetermined amount;
   determining that data access by the third party server has changed;
   determining that the third party server is not accessing at least some data that the server is configured to share with the third party server; and
   determining that the third party server is accessing data that is not required by the third party server.

14. The method of claim 10, wherein the alternative third party server is identified based on category data associated with the third party server.

15. The method of claim 10, wherein determining that data sharing with the third party server is to be modified comprises retrieving a stored risk profile for the authenticated entity.

16. The method of claim 10, wherein modifying the sharing of data with the third party server comprises revoking the access token.

17. The method of claim 10, wherein modifying the sharing of data with the third party server comprises modifying the access permission associated with the access token.

18. A non-transitory computer readable storage medium comprising processor-executable instructions which, when executed, configure a processor to:
   receive, from a remote computing device, a signal representing an indication of consent for an authenticated entity to share data with a third party server;
   in response to receiving the indication of consent, issue an access token to the third party server, the access token for accessing data associated with the authenticated entity;
   monitor a risk parameter associated with the third party to detect a change in the risk parameter;
   responsive to detecting the change in the risk parameter:
   identify an alternative third party server;
   send, to the remote computing device, a notification that includes a first selectable option to modify a data sharing option associated with the third party server and a second selectable option to replace the third party server with the alternative third party server;
   determine, based on a signal received from the authenticated entity indicating selection of the first selectable option, that data sharing with the third party server is to be modified based on the change in risk parameter; and
   modify the data sharing for the authenticated entity with the third party server by at least one of revoking the access token and modifying an access permission associated with the access token.

19. The server of claim 1, wherein the instructions further configure the processor to:
   determine, based on a signal received from the authenticated entity indicating selection of the second selectable option, that the third party server is to be replaced with the alternative third party server; and
   configure the data sharing for the authenticated entity with the alternative third party server.

20. The method of claim 10, further comprising:
   determining, based on a signal received from the authenticated entity indicating selection of the second selectable option, that the third party server is to be replaced with the alternative third party server; and
   configure the data sharing for the authenticated entity with the alternative third party server.

* * * * *